US 8,213,318 B2
Jul. 3, 2012

(12) United States Patent
Ooba et al.

(10) Patent No.: US 8,213,318 B2
(45) Date of Patent: Jul. 3, 2012

(54) SYSTEM FOR REMOTE SUPERVISION AND DIAGNOSIS USING MOBILE PROGRAM

(75) Inventors: Yoshikazu Ooba, Hachioji (JP); Kimito Idemori, Saitama (JP); Katsuhiro Sumi, Hino (JP); Hideki Ohno, Koganei (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 190 days.

(21) Appl. No.: 12/362,072

(22) Filed: Jan. 29, 2009

(65) Prior Publication Data
US 2009/0196187 A1    Aug. 6, 2009

(30) Foreign Application Priority Data
Jan. 31, 2008    (JP) ................................ 2008-022000

(51) Int. Cl.
*G01R 31/08* (2006.01)
(52) U.S. Cl. ...................................................... 370/242
(58) Field of Classification Search .................. 370/60.1, 370/85.15, 242, 400
See application file for complete search history.

(56) References Cited

U.S. PATENT DOCUMENTS

| | | | | | |
|---|---|---|---|---|---|
| 5,299,207 | A | * | 3/1994 | Fujii | 714/45 |
| 5,500,944 | A | * | 3/1996 | Yoshida | 714/47.3 |
| 5,561,769 | A | * | 10/1996 | Kumar et al. | 709/202 |
| 5,638,514 | A | * | 6/1997 | Yoshida et al. | 709/224 |
| 5,742,754 | A | * | 4/1998 | Tse | 714/38.14 |
| 5,970,477 | A | * | 10/1999 | Roden | 705/32 |
| 6,912,572 | B1 | * | 6/2005 | Fischer | 709/224 |
| 7,463,140 | B2 | * | 12/2008 | Schmidt | 340/514 |
| 7,760,668 | B1 | * | 7/2010 | Zinjuvadia | 370/256 |
| 2004/0199627 | A1 | * | 10/2004 | Frietsch | 709/224 |
| 2005/0004822 | A1 | * | 1/2005 | Elgrably | 705/7 |
| 2006/0120384 | A1 | * | 6/2006 | Boutboul et al. | 370/400 |
| 2006/0277446 | A1 | * | 12/2006 | Ikeno et al. | 714/47 |
| 2008/0195693 | A1 | * | 8/2008 | Gao et al. | 709/202 |
| 2009/0013311 | A1 | | 1/2009 | Ooba et al. | |
| 2009/0019319 | A1 | | 1/2009 | Ooba et al. | |

FOREIGN PATENT DOCUMENTS

| | | |
|---|---|---|
| JP | 9-288510 | 11/1997 |
| JP | 10-149374 | 6/1998 |
| JP | 2000-134786 | 5/2000 |
| JP | 2001-42925 | 2/2001 |
| JP | 2001-282554 | 10/2001 |
| JP | 2002-171506 | 6/2002 |

(Continued)

OTHER PUBLICATIONS

Notice of Reason for Rejection for Application No. 2008-022000, the Japanese Patent Office, mailed Feb. 16, 2010.
U.S. Appl. No. 12/395,009, filed Feb. 27, 2009, entitled System for Monitoring and Diagnosing Remote Devices, by Idemori et al.

(Continued)

*Primary Examiner* — Kwang B Yao
*Assistant Examiner* — Jung-Jen Liu
(74) *Attorney, Agent, or Firm* — Finnegan, Henderson, Farabow, Garrett & Dunner, L.L.P.

(57) ABSTRACT

A system for performing remote supervision and diagnosis, having a plurality of local terminals for performing supervision and diagnosis on an object, by executing a mobile program transmitted from a central system. When a disaster occurs and the network is cut, inevitably disconnecting the local terminals from the central system, one of the local terminals is set as a representative local terminal. The representative local terminal collects from the local terminals the maintenance information required for supervising and diagnosing the object.

10 Claims, 17 Drawing Sheets

FOREIGN PATENT DOCUMENTS

| | | |
|---|---|---|
| JP | 2002-297557 | 10/2002 |
| JP | 2003-58203 | 2/2003 |
| JP | 2003-114294 | 4/2003 |
| JP | 2003-206081 | 7/2003 |
| JP | 2004-70428 | 3/2004 |
| JP | 2004-199377 | 7/2004 |
| JP | 3621935 | 11/2004 |
| JP | 2005-259010 | 9/2005 |
| JP | 2006-280198 | 10/2006 |

OTHER PUBLICATIONS

Tsukui et al., "Megatrend in Supervisory/Control and Protective Relay Systems for Power Systems," Toshiba Review (1999), 54:26-29.

Hasegawa et al., "Intranet-Based Supervisory Control System for Power Systems," Toshiba Review (1999), 54:30-33.

Sekiguchi et al., "Power System Protection and Control System Applying Intranet Technology," Toshiba Review (1999), 54:34-37.

* cited by examiner

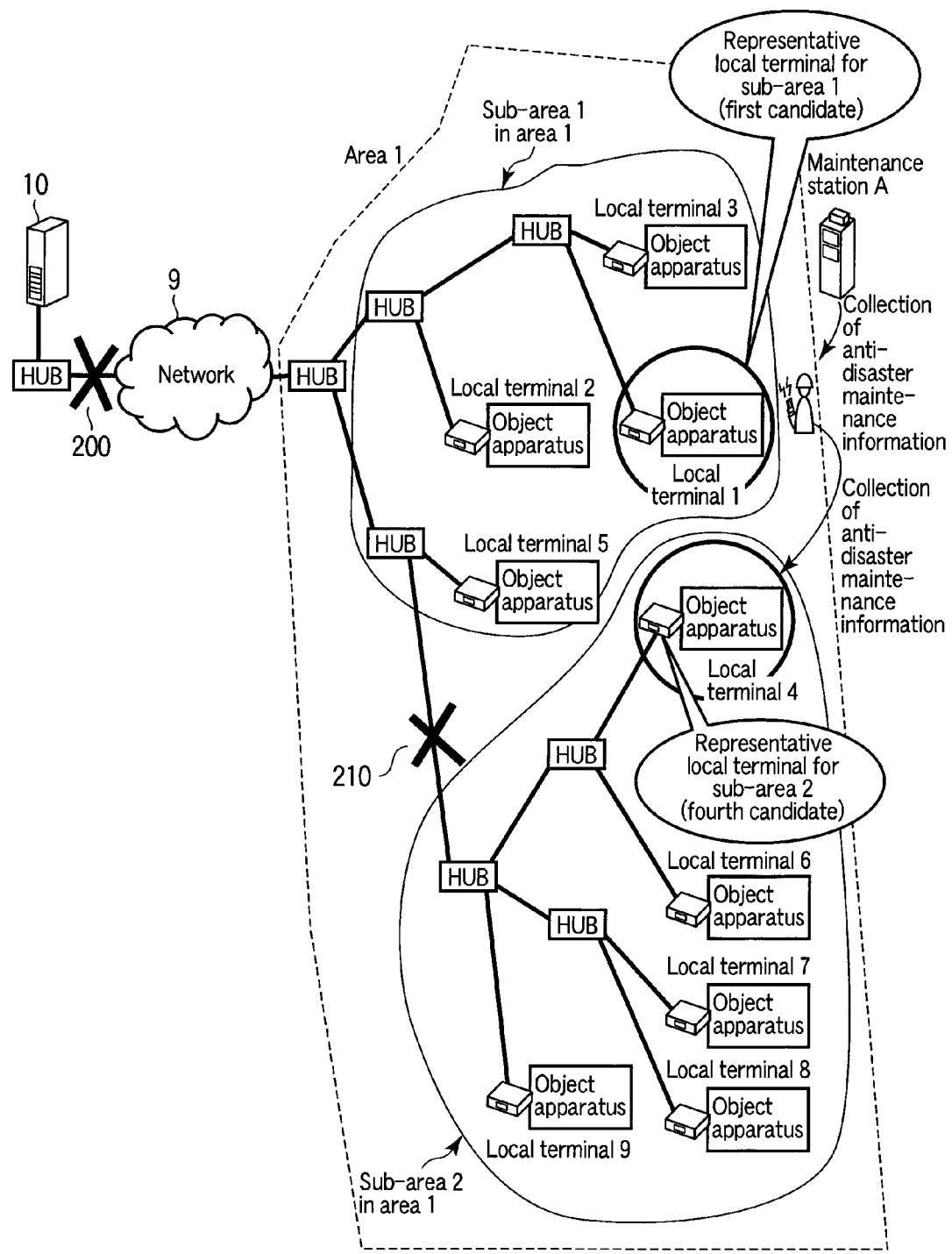
F I G. 5

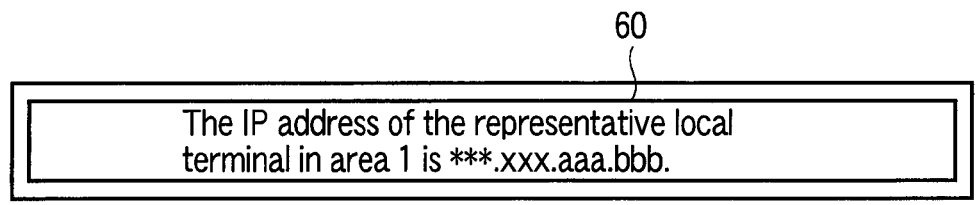
F I G. 6A
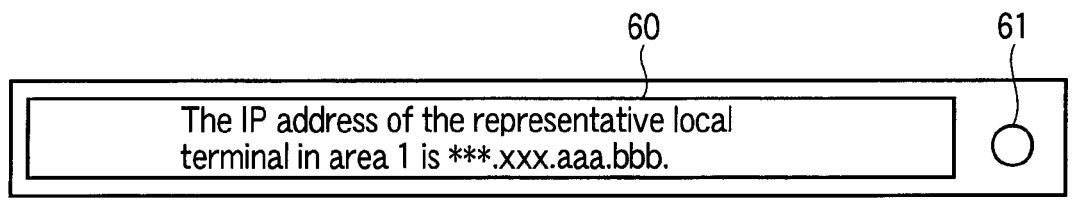
F I G. 6B
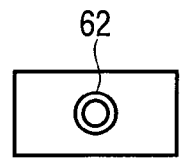
F I G. 6C
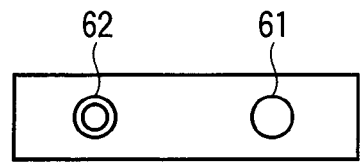
F I G. 6D · Determine if each local terminal has a clock trouble, from the time the  ~150
mobile program (agent) passes the terminal as it moves from the
representative local terminal Ts : the time the mobile program (agent) started
    Te : the time the mobile program (agent) returned to terminal
    T1 : the time the mobile program (agent) passed terminal 1
    T2 : the time the mobile program (agent) passed terminal 2

If this case, the following condition is satisfied :
Ts < T1 < T2 < Te

F I G. 15

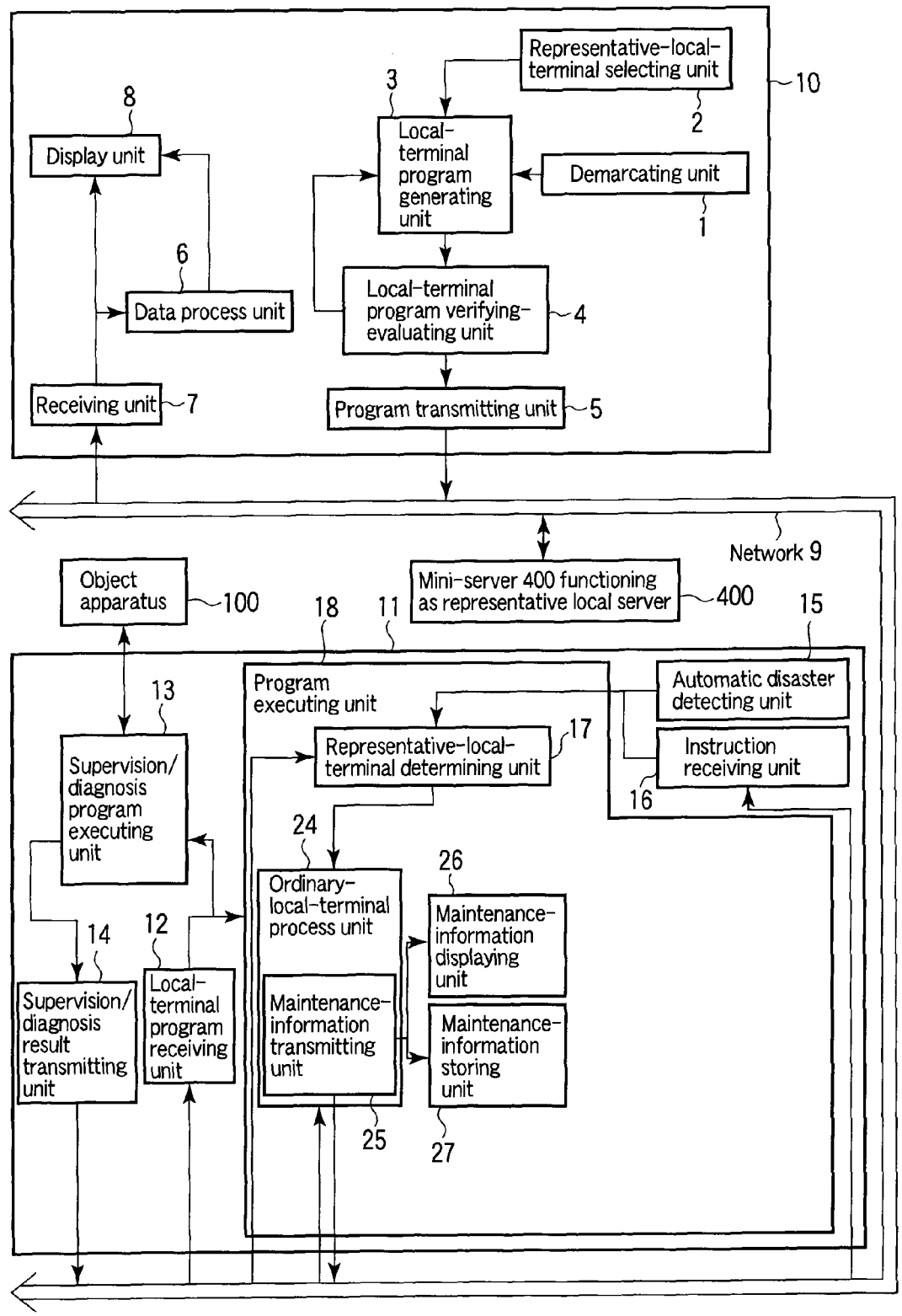
F I G. 18

SYSTEM FOR REMOTE SUPERVISION AND DIAGNOSIS USING MOBILE PROGRAM

CROSS-REFERENCE TO RELATED APPLICATIONS

This application is based upon and claims the benefit of priority from prior Japanese Patent Application No. 2008-022000, filed Jan. 31, 2008, the entire contents of which are incorporated herein by reference.

BACKGROUND OF THE INVENTION

1. Field of the Invention

The present invention relates to a technique of performing remote supervision and diagnosis, by using a mobile program that is transmitted from a central system via, particularly, a network.

2. Description of the Related Art

In recent years, systems have been developed, which are designed to perform remote supervision and diagnosis on an object, such as plant apparatus or an elevator, from a place remote from the object. More specifically, such a system is applied to a power-unit protection and control system that is configured to achieve remote protection and remote-control of, for example, a power system. Refer to, for example, the following Documents 1 to 3:
1. Ryouichi Tsukui, Fumio Matsuda and Kuniaki Suzuki, Power-System Supervision and Protection System in a Change, Toshiba Review, Vol. 54, No. 6, pp. 26-29, 1999
2. Yoshiaki Hasegawa, Yoshio Ebata and Hideki Hayashi, Power-System Supervision and Control System for Use in Combination with the Intranet, Toshiba Review, Vol. 54, No. 6, pp. 30-33, 1999
3. Katsuhiko Sekiguchi, Shoji Takenaka and Yoshihiro Shirota, Application of the Intranet Technology to Power-System Protection and Control System, Toshiba Review, Vol. 54, No. 6, pp. 34-37, 1999

A plant supervision and diagnosis system designed to perform remote supervision and diagnosis of a plant has been proposed (see, for example, Japanese Patent No. 3621935.) This system performs a supervision/diagnosis process and a plant control process, by executing a plant control program and a plant supervision/diagnosis program in cooperation. Further, a system that supervises, diagnoses, inspects and maintains a plurality of power plants from a remote site has been proposed (see, for example, Jpn. Pat. Appln. KOKAI Publication No. 2003-114294). This system is designed for plants such as power system and configured to utilize an intranet.

That is, various types of remote supervision and diagnosis systems have been developed or proposed, such as systems for supervision only, systems for diagnosis only, systems for supervising and diagnosing tens of thousands of objects, systems for supervising and diagnosing objects each having a various process functions, and systems using the Internet connected to the public line. Particularly in recent years, attention is paid to remote supervision and diagnosis systems using mobile agent technology (see, for example, Jpn. Pat. Appln. KOKAI Publications Nos. 2006-280198, 2004-70428, 2002-297557 and 2000-134786).

In most remote supervision and diagnosis systems, a network connects the remote objects and the central system (central supervision system). Due to a disaster, the network may fail to connect the remote objects and the central system. Measures must be taken to guard the system against disasters. To this end, it has hitherto been proposed that data be backed up, that servers be backed up or recovered (see, for example, Jpn. Pat. Appln. KOKAI Publication No. 2002-171506).

As stated above, some measures must be taken to guard the system against disasters, preventing the disconnection of the remote sites from the network in the event of a disaster. No prior art that can effectively guard the system is available, however. Once the network has failed to connect the remote objects and the central system, there is no other way than supervising and diagnosing the objects directly, one by one, employing maintenance personnel, and then utilizing the results of the supervision and diagnosis.

An enormous load is imposed on the maintenance staff member who collects maintenance information required for supervising and diagnosing the objects, in order to investigate the conditions of the objects during or immediately after a disaster, such as disconnection of the remote sites from the network. In view of this, the method of supervising and diagnosing the objects directly is not always effective to guard the system against disasters.

BRIEF SUMMARY OF THE INVENTION

An object of this invention is to provide a system for remote supervision and diagnosis that can efficiently collect maintenance information required for supervising and diagnosing an object when a disaster comes, so that effective measures may be taken against the disaster.

In an aspect of this invention, there is provided a system that has a plurality of local thermals configured to supervise and diagnose an object apparatus in accordance with a mobile program transmitted from a central system connected to the system by a network. When the network is cut at the event of a disaster, the representative local terminal collects anti-disaster maintenance information required for supervising and diagnosing an object apparatus.

An system for remote supervision and diagnosis, according to the aspect of this invention, comprises: a plurality of local terminals connected to a central system by a network and configured to perform supervision and diagnosis on an object apparatus existing in a specific area; a program-moving module configured to move a supervision/diagnosis program or an anti-disaster process program from the central system to any one of the local terminals; a setting module configured to set one of the local terminals arranged in the specific area as representative local terminal when the local terminals are disconnected from the central system in spite of the network; and an information-collecting module configured to collect anti-disaster maintenance information via the representative local terminal from any other local terminal arranged in the area.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 5 is a diagram representing the concept of switching the representative local terminal to another in the first embodiment;

FIGS. 6A to 6D are diagrams explaining exemplary data items the display unit of the first embodiment displays;

FIG. 15 is a conceptual diagram showing an exemplary process the mobile program performs to determine a trouble;

FIG. 18 is a block diagram showing the configuration of a system according to the fourth embodiment.

DETAILED DESCRIPTION OF THE INVENTION

An aspect of this invention is a system for remote supervision and diagnosis, in which when a disaster comes and disconnects local terminals for performing supervision and diagnosis in accordance with a mobile program transmitted from the central system, from the network connected to the central system, the representative local terminal collects the maintenance information required for supervising and diagnosing an object.

Embodiments of the present invention will be described, one by one, with reference to the accompanying drawings.

First Embodiment

Figure 1:
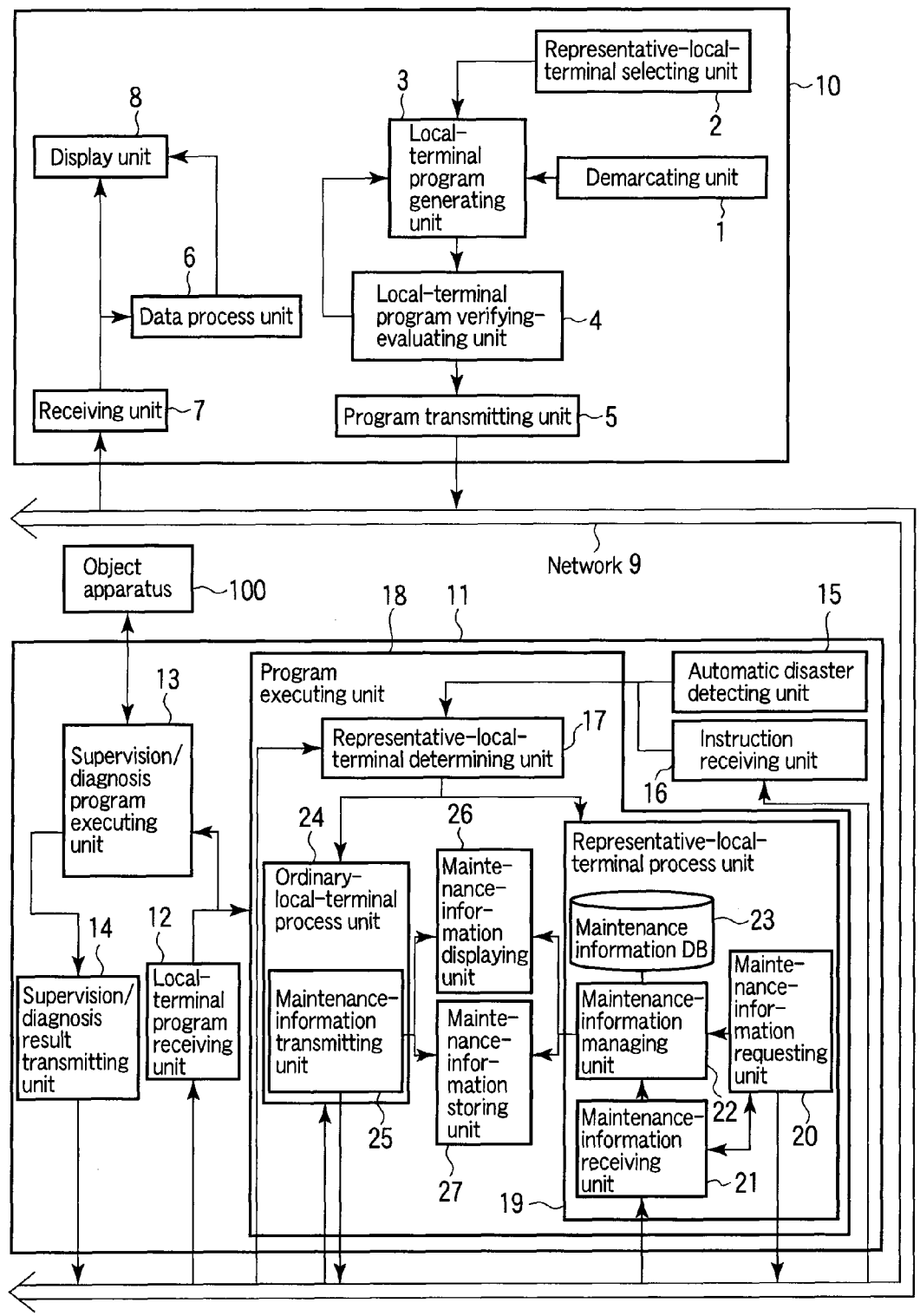
FIG. 1 is a block diagram explaining the configuration of a system according to a first embodiment of the present invention.
Figure 2:
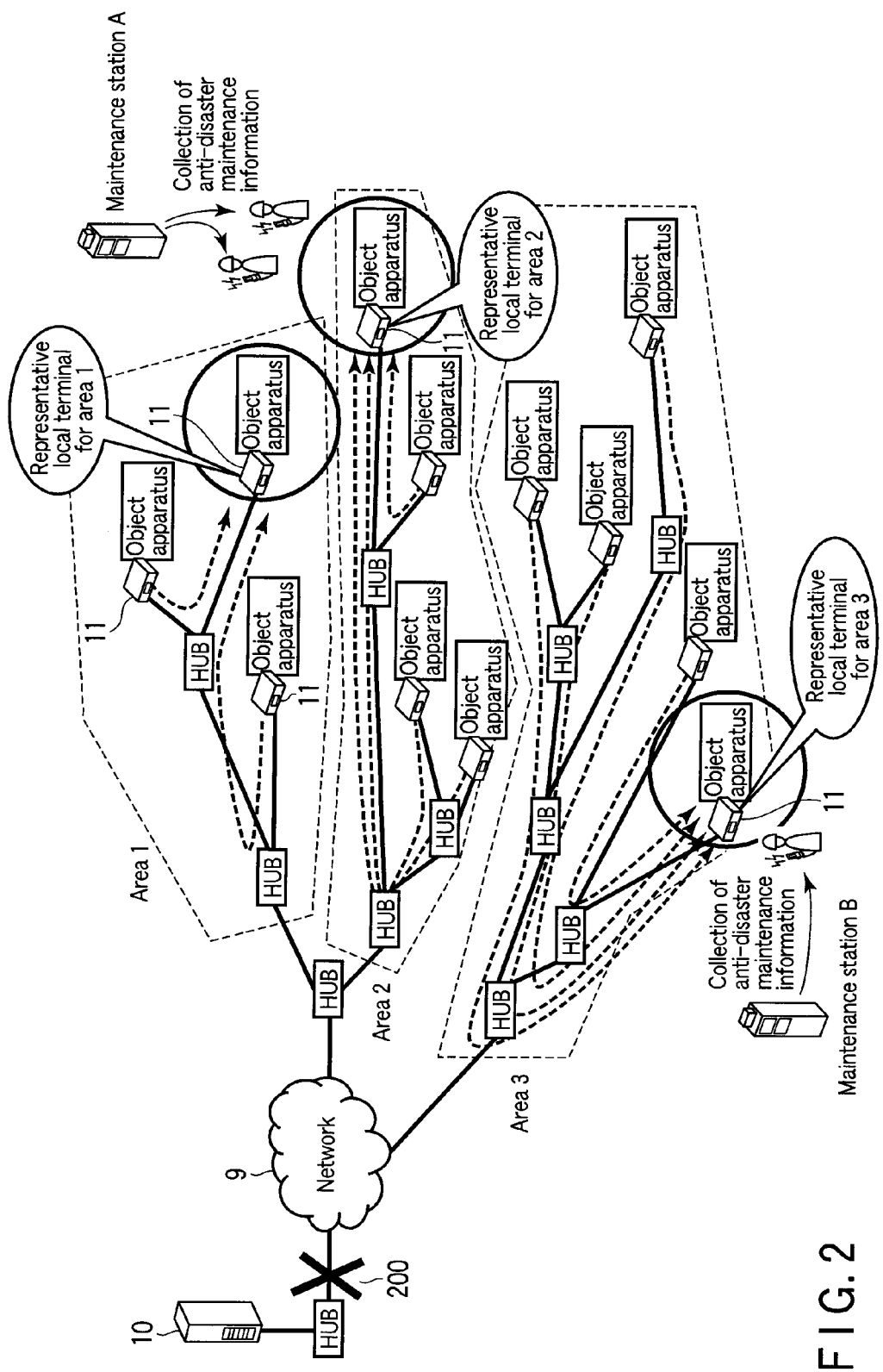
FIG. 2 is a diagram representing the concept of operation of the system according to the first embodiment.

FIG. 1 is a block diagram explaining the configuration of a system for remote supervision and diagnosis, according to a first embodiment of this invention. FIG. 2 is a diagram representing the concept of operation of the system according to the first embodiment.

(Configuration of the System)

As shown in FIG. 1, the system for performing remote supervision and diagnosis comprises a central system (central supervision system) 10 and local terminals 11 (only one is shown in FIG. 1). The local terminals 11 are connected by a network 9 to the central system 10. Each local terminal 11 performs supervision and diagnosis on an object apparatus 100 installed a site remote from the central system 10. In normal state, the network 9 connects the local terminals 11 to the central system 10 (see FIG. 2).

The object apparatus 100 shown in FIG. 1 is, for example, an elevator installed in a building. Hence, the local terminals 11 are provided in the elevators, respectively. Each local terminal 11 therefore performs supervision and diagnosis on the operation of one elevator.

The central system 10 comprises an area demarcating unit 1, a unit 2 for selecting a representative local terminal to be supervised and diagnosed (hereinafter called "representative-local-terminal selecting unit), a local-terminal program generating unit 3, a local-terminal program verifying-evaluating unit 4, a program transmitting unit 5, a supervision/diagnosis data process unit (hereinafter called "data process unit) 6, a supervision/diagnosis result receiving unit (hereinafter called "receiving unit") 7, and a supervision/diagnosis result displaying unit (hereinafter called "display unit) 8.

Each local terminal 11 has a local-terminal program receiving unit 12, a supervision/diagnosis program executing unit 13, a supervision/diagnosis result transmitting unit 14, an automatic disaster detecting unit 15, an anti-disaster-process-start instruction receiving unit 16, and an anti-disaster-process program executing unit 18.

The anti-disaster-process program executing unit 18 has a representative-local-terminal determining unit 17, an anti-disaster representative-local-terminal process unit 19, an anti-disaster ordinary-local-terminal process unit 24, an anti-disaster maintenance-information displaying unit 26, and an anti-disaster maintenance-information storing unit 27.

Further, the anti-disaster representative-local-terminal process unit 19 includes an anti-disaster maintenance-information requesting unit 20, an anti-disaster maintenance-information receiving unit 21, an anti-disaster maintenance-information managing unit 22, and an anti-disaster maintenance information database (DB) 23. The anti-disaster ordinary-local-terminal process unit 24 includes an anti-disaster maintenance-information transmitting unit 25.

(Operation of the System)

How the system according to this embodiment operates will be described with reference to FIGS. 2 to 6.

Assume that the system according to this embodiment has three local terminals 11 that are, as shown in FIG. 2, connected to the central system 10 by the network 9, are arranged in each of three areas (local network areas, or maintenance areas) 1 to 3, respectively, and are managed by the central system 10. The maintenance areas 1 to 3 are, for example, areas in one building, and the object apparatus 100, which is supervised and diagnosed, is an elevator operating in the maintenance areas 1 to 3. The local terminals 11 are terminals arranged outside the object apparatus 100 or are the terminals incorporated in the object apparatus 100.

The system according to this embodiment is composed of two major sections. One section comprises units that perform remote supervision and diagnosis on the maintenance areas 1 to 3. The other section comprises units that take measures against a disaster. The remote supervision and diagnosis are accomplished in the central system, by the local-terminal program generating unit 3, local-terminal program verifying-evaluating unit 4, program transmitting unit 5, data process unit 6, receiving unit 7 and display unit) 8. In each local terminal 11, the local-terminal program receiving unit 12, supervision/diagnosis program executing unit 13 and supervision/diagnosis result transmitting unit 14 work to accomplish the remote supervision and diagnosis.

The local-terminal program generating unit 3 generates a local-terminal program for use in the local terminals 11. In this embodiment, the local terminal program contains a supervision/diagnosis program and an anti-disaster process program. More precisely, the local-terminal program generating unit 3 generates a supervision/diagnosis program for executing a supervision/diagnosis algorithm in the form of a mobile program that uses a movable multi-agent or the like. The anti-disaster process program contains a mobile program for collecting maintenance information when a disaster comes. This movable program will be described later.

The supervision/diagnosis program may be generated by compiling ordinary program-source codes and rendered executable, or by using script codes. In either case, the program can actually perform a supervision/diagnosis process in each local terminal 11. The simplest supervision/diagnosis program may be an algorithm that "sets a threshold value for determining abnormality, and determines an abnormal state has developed, if the threshold value is surpassed and generates an alarm."

The supervision/diagnosis program is generated as a mobile program by the local-terminal program generating unit 3 in the central system 10. The supervision/diagnosis program is distributed from the program transmitting unit 5 via the network 9 to the local terminals 11 (i.e., local terminals arranged in the areas 1 to 3, respectively). The term "mobile program" means, in its broad sense, an agent or program that can move in networks. The word "agent" usually means a mobile program, and means, in most cases, a mobile program that contains high functions such as inter-agent program.

In the central system 10, the local-terminal program verifying-evaluating unit 4 verifies and evaluates the program generated by the local-terminal program generating unit 3. To be more specific, the local-terminal program verifying-evaluating unit 4 performs software simulation, using the source codes of the program, the program compiled and the script codes, thereby verify and evaluate the program generated by the local-terminal program generating unit 3.

In the software simulation, the unit 4 uses an object pseudo-behavior program that simulates the behavior of an object that is supervised and diagnosed. The supervision/diagnosis program performs a supervision/diagnosis process in accordance with the results of the software simulation of the object. The result of the supervision/diagnosis process is displayed. Based on the result displayed, the operator can confirm or determine whether the supervision/diagnosis program generated works as is intended. If the program generated does not so work, the local-terminal program generating unit 3 will correct the program.

The program generated by the local-terminal program generating unit 3 may be verified and evaluated by the local-terminal program verifying-evaluating unit 4 as working as intended. In this case, the program (mobile program) is distributed from the program transmitting unit 5 via the network 9 to the local terminals 11. In each local terminal 11, the local-terminal program receiving unit 12 receives the mobile program. The local-terminal program receiving unit 12 then supplies the supervision/diagnosis program to the supervision/diagnosis program executing unit 13, and the anti-disaster process program to the anti-disaster-process program executing unit 18.

The network 9 is an intranet, the Internet or the like. If the maintenance areas 1 to 3 exist in a relatively small region (e.g., only one floor of the building), the network 9 may be a network composed of electric wires. If the network 9 is a wireless network such as the Internet, some security measures must be taken. If such a network is used to transmit the mobile program from the central system 10 to any local terminal 11, the program transmitting unit 5 of the central system 10 and the local-terminal program receiving unit 12 of the local terminal 11 perform security processes, such the encryption, authentication and decryption of the program data.

In each local terminal 11, the supervision/diagnosis program executing unit 13 executes the supervision/diagnosis program, using the information acquired from the object apparatus 100. More specifically, the local terminal 11 refers to the internal unit memory or port provided in the object apparatus 100, acquiring the information necessary for the supervision and diagnosis, such as measured values, designated current values, and the like.

The supervision/diagnosis result transmitting unit 14 transmits the result of the supervision and diagnosis the supervision/diagnosis program executing unit 13 has performed, via the network 9 to the central system 10. In the central system 10, the receiving unit 7 receives the result of the supervision and diagnosis, which has been transmitted from the local terminal 11 via the network 9. If the network 9 is the Internet, it should be rendered secure. To this end, the transmitting unit 14 of the local terminal 11 and the receiving unit 7 of the central system 10 perform security processes, such the encryption, authentication and decryption of the result of the supervision and diagnosis.

As described above, the program transmitting unit 5 transmits the program. Nonetheless, the unit 5 needs only to transmit parameters if the program has not changed at all and only the parameters have changed. That is, if supervision/diagnosis program can reflect the parameter changes (because the parameters are contained as an independent file), only the parameters may be transmitted, whereby the parameters are used to achieve the supervision and diagnosis.

In the central system 10, the receiving unit 7 decrypts the result of supervision and diagnosis of the object apparatus 100, if the result has been encrypted before transmitted to the central system 10. The supervision/diagnosis result, thus decrypted, is supplied to the data process unit 6 and the display unit 8. The data process unit 6 performs a specific process on the supervision/diagnosis result about the object apparatus 100. More precisely, the data process unit 6 consolidates the supervision/diagnosis results about the object apparatus 100, acquired at various positions. The data process unit 6 supplies the result of the process to the display unit 8. The display unit 8 displays the process result coming from the data process unit 6 and the supervision/diagnosis result received by the receiving unit 7, on the screen such as a liquid crystal display screen.

(Function of Taking Measures Against a Disaster)

How the system according to this embodiment performs the function of taking measures against a disaster will be explained with reference to the flowcharts of FIGS. 3 and 4.

The system performs this function when a disaster comes. As shown in FIG. 2, a part 200 of the network 9 connected to the central system 10 may be cut when a disaster occurs. (That is, an electric wire may be cut if the network 9 is composed of electric wires, or a radio device has a trouble if the network 9 is a radio network). In this case, the function is performed to collect anti-disaster maintenance information from each local terminal 11 in order to supervise and diagnose the object apparatus 100.

More specifically, the area (e.g., a building) in which the object apparatus 100 is installed is divided into three maintenance areas 1 to 3. A plurality of local terminals are provided in each maintenance area. One of these local terminals represents the other local terminals provide in the maintenance area and will therefore be hereinafter called "representative local terminal." The representative local terminal acquires anti-disaster maintenance information items from all other local terminals provided in the area. A maintenance-staff member can obtain from the representative local terminal the anti-disaster maintenance information acquired by all other local terminals, without walking to all local terminals provided in the maintenance area.

When a disaster takes place, the area demarcating unit 1 and representative-local-terminal selecting unit 2 of the central system 10 cooperate to generate information from which to prepare an anti-disaster process program that the local terminals 11 should execute. The area demarcating unit 1 divides the local area into maintenance areas 1 to 3 when the network 9 connecting any local terminal 11 to the central system 10 is cut. Thus, the unit 1 provides maintenance areas 1 to 3 from which anti-disaster maintenance information is acquired at the time a disaster takes place. The anti-disaster maintenance information thus acquired will be managed.

The local area where the object apparatus 100 is installed is divided into maintenance areas of the same size. Preferably, the number of maintenance areas thus provided is equal to the number of maintenance stations, because the states in the respective maintenance areas must be examined in order to achieve the maintenance of the object apparatus 100. The present embodiment is based on the assumption that three maintenance stations exist, though only two maintenance stations A and B are illustrated in FIG. 2 for convenience.

In some cases, it may be difficult to divide the local area into maintenance areas of the same size because of the locations of the maintenance stations. If so, the local area may be divided into maintenance areas so that the maintenance stations may be spaced equidistantly. If a great earthquake happens near an active fault, the ground surface may most probably shift. At such an event, the network 9 will very possibly be cut. In view of this, the data about the active fault may be taken into consideration to determine how the local area should be divided into maintenance areas. (For example, the local area may be divided into maintenance areas that lie above no active faults.) The area demarcating unit 1 uses this method, dividing the local area into maintenance areas in which the network 9 may scarcely be cut.

The representative-local-terminal selecting unit 2 selects one of the local terminals 11 existing in each of the maintenance areas 1 to 3. For example, the unit 2 first selects, as the representative local terminal, the local terminal 11 at a shorter distance from the nearest maintenance station than any other terminals provided in the maintenance area, and then the other local terminal 11 at the second shorter distance from the nearest maintenance station, and so forth.

The local-terminal program generating unit 3 refers to the information items about the maintenance areas formed by the area demarcating unit 1 and an information item representing the order in which to select representative local terminals and which has been determined by the representative-local-terminal selecting unit 2. The unit 3 thereby generates an anti-disaster process program that operates when a disaster takes place.

The information items about the maintenance areas are identification (ID) data items that identify the local terminals 11 existing in each of the areas 1 to 3, respectively. The identification (ID) data items are associated with the identification (ID) data item identifying the area. The information item representing the order in which to select representative local terminals 11 is associated with the IDs of the local terminals 11 existing in the area and the selection order of the representative local terminal in the area. The local-terminal program generating unit 3 holds these information items as an internal unit or a set file contained in the program.

Like the aforementioned supervision/diagnosis program, the anti-disaster process program thus generated is verified and evaluated by the local-terminal program verifying-evaluating unit 4. If the anti-disaster process program (mobile program) is verified and evaluated as having no problems, it is distributed from the program transmitting unit 5 via the network 9 to each local terminal 11. In the local terminal 11, the local-terminal program receiving unit 12 receives the mobile program distributed from the central system 10 and transfers the same to the anti-disaster-process program executing unit 18.

The anti-disaster-process program executing unit 18 remains to operate until a disaster occurs. When the automatic disaster detecting unit 15 detects the disaster or when the anti-disaster-process-start instruction receiving unit 16 issues an anti-disaster start instruction, the anti-disaster-process program executing unit 18 determines that a disaster has come and therefore starts executing the anti-disaster process program. The automatic disaster detecting unit 15 detects the occurrence of the disaster from the detection signal coming from, for example, an earthquake sensor. The anti-disaster-process-start instruction receiving unit 16 outputs the anti-disaster start instruction when the maintenance-staff member, for example, connects his her portable instruction-transmitting terminal to the network covering the local area and the portable instruction-transmitting terminal then transmits the anti-disaster start instruction to the anti-disaster-process-start instruction receiving unit 16.

Figure 3:
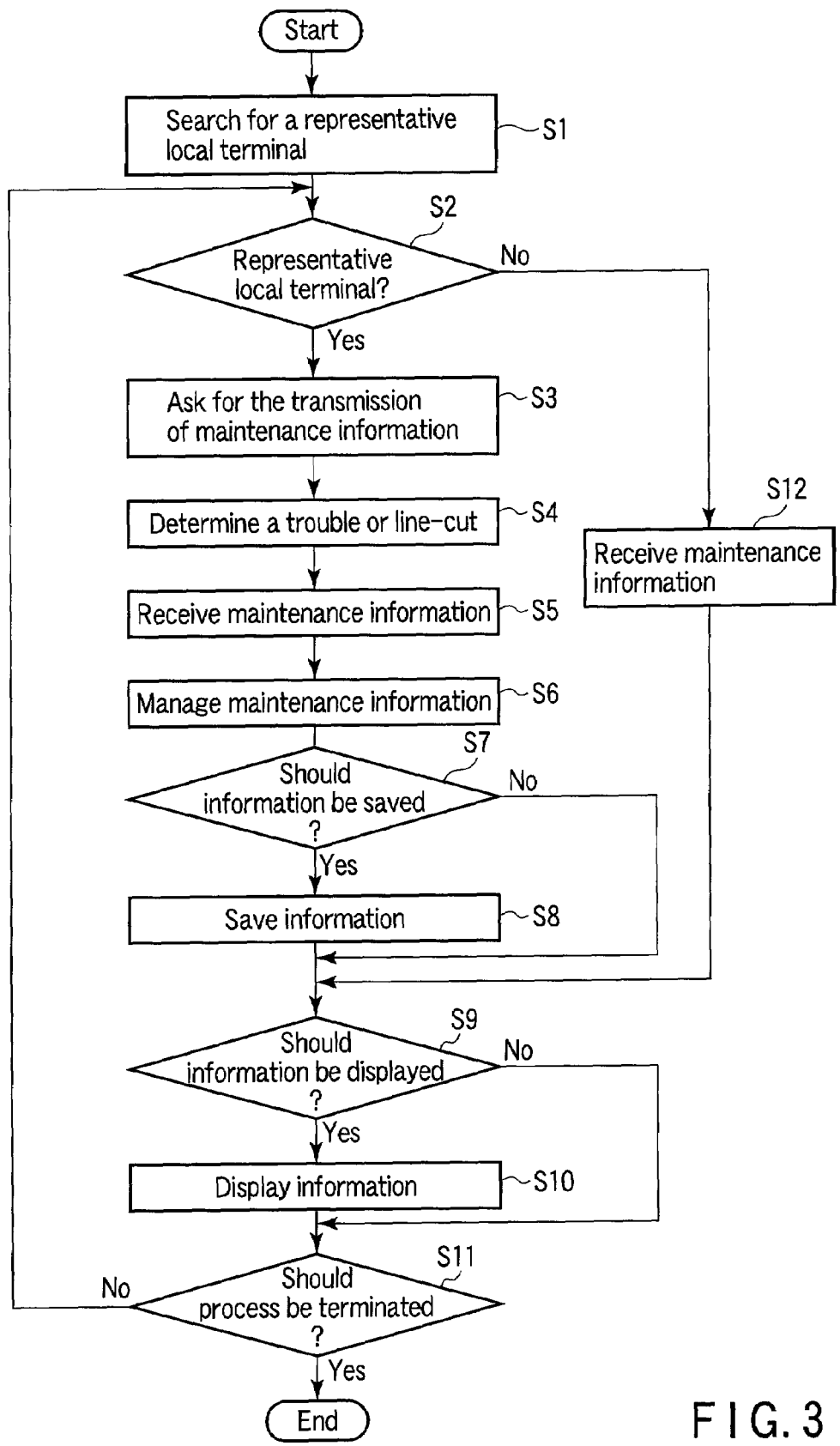
FIG. 3 is a flowchart explaining the process sequence described in an information collecting program used in the first embodiment.
Figure 4:
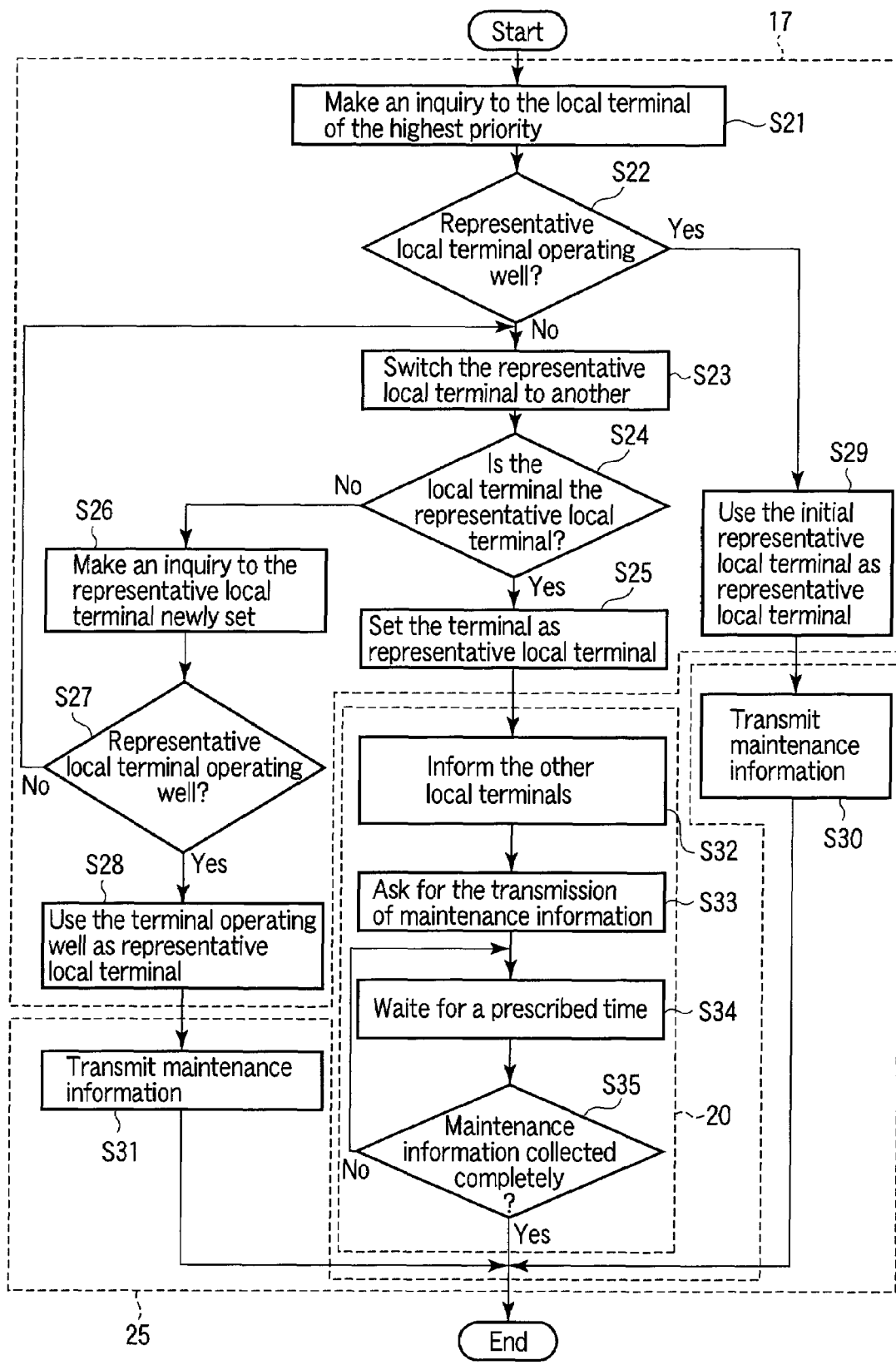
FIG. 4 is a flowchart explaining the sequence of collecting maintenance information in the first embodiment.

Executing the anti-disaster process program, the anti-disaster-process program executing unit 18 performs such a process sequence as shown in the flowchart of FIG. 3.

In the anti-disaster-process program executing unit 18 of the local terminal 11, the representative-local-terminal determining unit 17 first refers to the information item representing the order in which to select representative local terminals and which has been determined by the representative-local-terminal selecting unit 2 of the central system 10, determining whether the local terminal 11 the terminal that represents the maintenance area (Steps S1 and S2). If the local terminal 11 is the representative local terminal (if YES in Step S2), the process goes to Step S3. If the local terminal 11 is not the representative local terminal (if NO in Step S2), the process goes to Step S12.

In Step S3, the anti-disaster maintenance-information requesting unit 20 incorporated in the anti-disaster representative-local-terminal process unit 19 requests all local terminals 11 existing in the local area to transmit the anti-disaster maintenance information. At this point, the anti-disaster maintenance-information requesting unit 20 informs the anti-disaster maintenance-information receiving unit 21 and anti-disaster maintenance-information managing unit 22 that a request has been made for all local terminals 11 existing in the local area.

If no responses come from the local terminals 11 to which the request has been made for the anti-disaster maintenance-information, the anti-disaster maintenance-information requesting unit 20 determines that any line has been cut in the local area or the local terminals 11 are malfunctioning (Step 4).

In the anti-disaster representative-local-terminal process unit 19, the anti-disaster maintenance-information receiving unit 21 receives the anti-disaster maintenance information that the local terminals in the local area have transmitted in response to the request (Step S5). The anti-disaster maintenance-information receiving unit 21 then transfers the anti-disaster maintenance information to the anti-disaster maintenance-information managing unit 22.

The anti-disaster maintenance-information managing unit 22 operates to supply the anti-disaster maintenance information to the anti-disaster maintenance information DB 23, to store the information in the DB 23 and to transfer the information to the anti-disaster maintenance-information displaying unit 26 (Step S6). The anti-disaster maintenance information DB 23 is, for example, a flash memory, and stores the anti-disaster maintenance information in the form of a data file. The anti-disaster maintenance-information managing unit 22 supplies the information representing a line-cut, if any in the local area, and the information representing malfunction (if any in any local terminal 11), to the anti-disaster maintenance information DB 23. The anti-disaster maintenance information DB 23 accumulates these information items as anti-disaster maintenance information.

Whether necessary information should be saved or not is then determined (Step S7). If YES in Step S7, the anti-disaster maintenance-information managing unit 22 acquires information items that should be saved, from the anti-disaster maintenance information received from each local terminal. These information items are transferred to the anti-disaster maintenance-information storing unit 27 and saved in this unit 27 (Step S8).

The anti-disaster maintenance-information storing unit 27 operates for the maintenance-staff member who collects the anti-disaster maintenance information from each local terminal 11. To collect the anti-disaster maintenance information, the maintenance-staff member holding a portable instruction-transmitting terminal walks to the local terminal, connects the portable instruction-transmitting terminal to the local terminal, and has the information downloaded into the portable instruction-transmitting terminal.

Information is acquired from the representative local terminal, thereby obtaining the anti-disaster maintenance information from all local terminals existing in the maintenance area. If the local terminals have a rechargeable battery each and if the anti-disaster maintenance information can be distributed by radio, the maintenance-staff member can collect the information at some distance from the local terminals (that is, at a safe location) even if he or she can hardly approach the local terminals because of the disaster. Further, if the local terminals 11 have a rechargeable battery each and can therefore operate even at a disaster, the maintenance-staff member can collect the information even if the commercially available power supply fails due to the disaster. When the automatic disaster detecting unit 15 detects the occurrence of a disaster, the power supply of each local terminal 11 may be switched from the commercially available power supply to the battery provided in the local terminal 11. Alternatively, a battery may be connected at all times to each local terminal 11, whereby the local terminal 11 can keep operating even if any lines in the maintenance area are cut.

Next, the process goes from Step S8 to Step S9. In Step S9, whether the anti-disaster maintenance information received from each local terminal should be displayed is determined. If the anti-disaster maintenance information should be displayed (if YES in Step S9), the anti-disaster maintenance information is transferred to the anti-disaster maintenance-information displaying unit 26. The anti-disaster maintenance-information displaying unit 26 displays the anti-disaster maintenance information on the screen (Step S10).

More specifically, as shown in FIG. 6A, the anti-disaster maintenance-information displaying unit 26, which is a liquid crystal display, displays on the liquid crystal screen 60 the anti-disaster maintenance information in the form of a text data. On the screen 60, various text data items are repeatedly displayed (each text data item, for n seconds, e.g., two seconds). Note that the information (e.g., IP addresses of the local terminals), which enables the representative local terminal to request all local terminals provided in the maintenance area to transmit the anti-disaster maintenance information, is contained in the anti-disaster process program or stored as a set file that can be referred to on the local terminals.

As shown in FIG. 6B, the anti-disaster maintenance-information displaying unit 26 has not only the liquid crystal screen 60, but also a display-information switching button 61. Every time the display-information switching button 61 is pushed, the information displayed on the screen 60 is switched to another. The maintenance-staff member may repeatedly push the button 61 until the unit 26 displays the information important to him or her. This helps him or her to obtain the very information he or she wants. The display-information switching button 61 may be replaced by a dial that the maintenance-staff member may turn to have any desired information displayed on the liquid crystal screen 60.

Each local terminal 11 may have no space for holding the liquid crystal screen 60. If this is the case, a light-emitting diode (LED) 62 may be used instead, as shown in FIG. 6C. The anti-disaster maintenance-information displaying unit 26 displays the anti-disaster maintenance-information as the LED 62 changes the color of the light it emits or blinks in a different manner. For example, the color of light or the manner of blinking is changed to display the anti-disaster maintenance-information. Alternatively, the LED 62 may be turned on at the time of a flag-on and may blink at the time of a flag-off. Note that the information is repeatedly displayed at intervals of n seconds (e.g., two seconds).

The LED 62 may blink in order to inform the maintenance-staff member that the local terminal is the representative local terminal. The LED 62 may be replaced by a plurality of LEDs. In this case, the LEDs may emit different colors or may blink in different manners (at different intervals, each turned on for one period and off for a different period, or first rapidly blinks three times and then long remains off). The simplest method is to use two LEDs to display a two-bit data item. That is, the first LED represents bit "1" when on and bit "0" when off, showing whether the information is coming from the representative local terminal, and the second LED represents bit "1" when on and bit "0" when off, showing any line has been cut or whether the local terminal is isolated from any other local terminal.

Further, as shown in FIG. 6D, the anti-disaster maintenance-information displaying unit 26 may have a display-information switching button 61 and an LED 62. The LED 62 emits light in different colors in accordance with the anti-disaster maintenance-information, or may be turned on at the time of a flag-on and may blink at the time of a flag-off, as has been described above. On the other hand, the display-information switching button 61 may be repeatedly pushed, whereby the unit 26 displays the information items one after another.

The representative-local-terminal determining unit 17 may determine that the local terminal 11 is not the representative local terminal (NO in Step S2). If this is the case, the process goes to Step S12, in which the anti-disaster ordinary-local-terminal process unit 24 starts operating. In the anti-disaster ordinary-local-terminal process unit 24, the anti-disaster maintenance-information transmitting unit 25 transmits the anti-disaster maintenance-information about the local terminal to the representative local terminal in response to the request transmitted from the representative local terminal. The anti-disaster maintenance-information contains the data identifying the local terminal (ID, IP address or the like), the data showing whether the local terminal is normally operating (flag), the data representing the time of transmitting the information, and the data showing whether the local terminal is malfunctioning (see FIG. 10).

Figure 10:
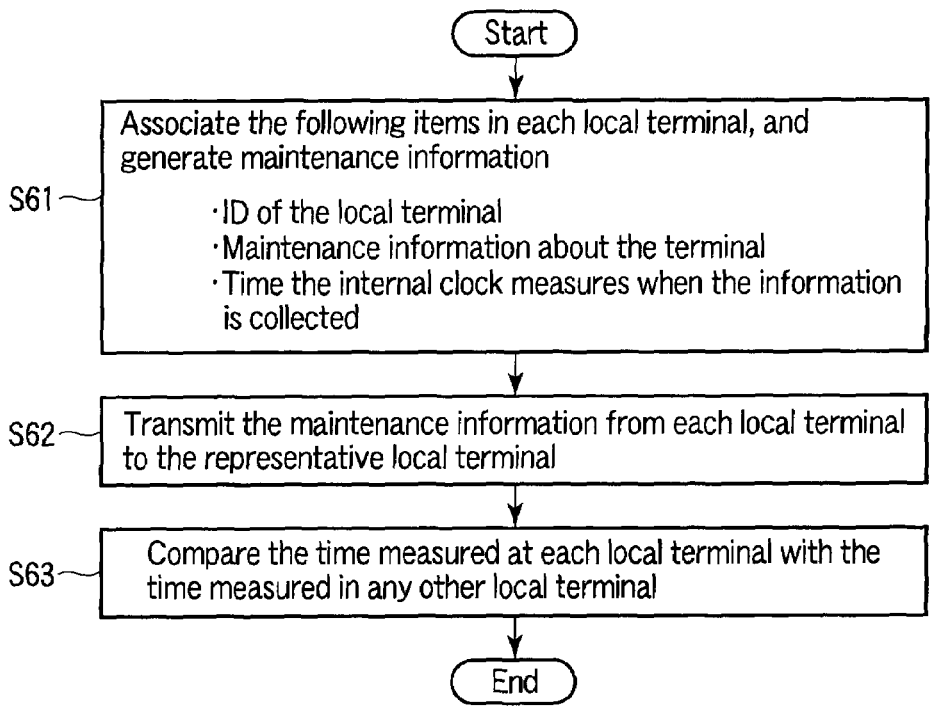
FIG. 10 is a flowchart explaining the process sequence each local terminal performs in order to transmit maintenance information to the representative local terminal in the first embodiment.
Figure 11:
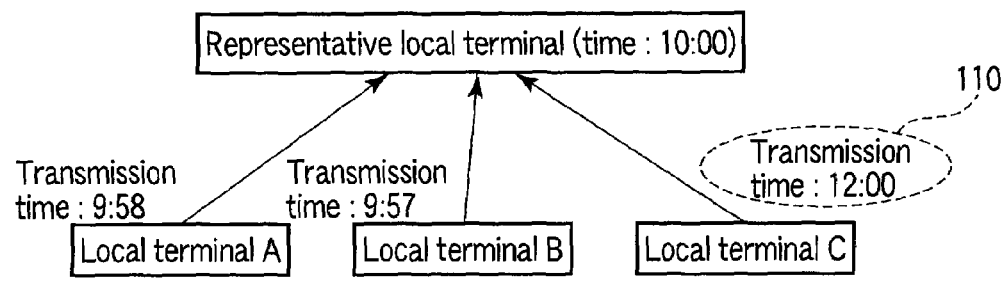
FIG. 11 is a diagram representing the concept of operation of the representative local terminal used in the first embodiment.

FIG. 10 is a flowchart explaining the process sequence each local terminal performs in order to transmit anti-disaster maintenance information to the representative local terminal. The anti-disaster maintenance information includes malfunction-indicating data that consists of malfunction-indicting bits associated with the components of each local terminal, respectively. Each bit indicates that the associated component is malfunctioning if it is "1," and that the associated component is not malfunctioning if it is The anti-disaster maintenance information may further include useful data items that can be used to take measures against a disaster, unless the information overflows the data storage provided in representative local terminal or unless an excessive load is imposed on the network 9. Moreover, the data representing the time of transmitting the information may be added to the anti-disaster maintenance information. From the data added, the time when a disaster occurs can be inferred (see FIG. 10 and FIG. 11). When the representative local terminal receives the anti-disaster maintenance information, the data representing the time the information is received is added to the anti-disaster maintenance information. The data added is managed in the representative local terminal, thereby to determine how much time has been spent in transmitting the information from the local terminal to the representative local terminal. The time when the representative local terminal receives the information is compared with the time when the local terminal transmits the information. If the difference is not appropriate, it can be utilized as trigger data representing the trouble in the time-measuring component (e.g., internal clock) incorporated in the transmitting local terminal or representative local terminal (see Steps S61 to S63 shown in FIG. 10).

A time-matching server may be used for the local terminals and the representative terminal. In other words, each local terminal may matched to the representative local terminal in terms of time by using the time-matching server. In this case, time data more correct can be obtained than otherwise, and the time lag between the representative local terminal and each local terminal can be determined (see Step S110 shown in FIG. 11).

Figure 14:
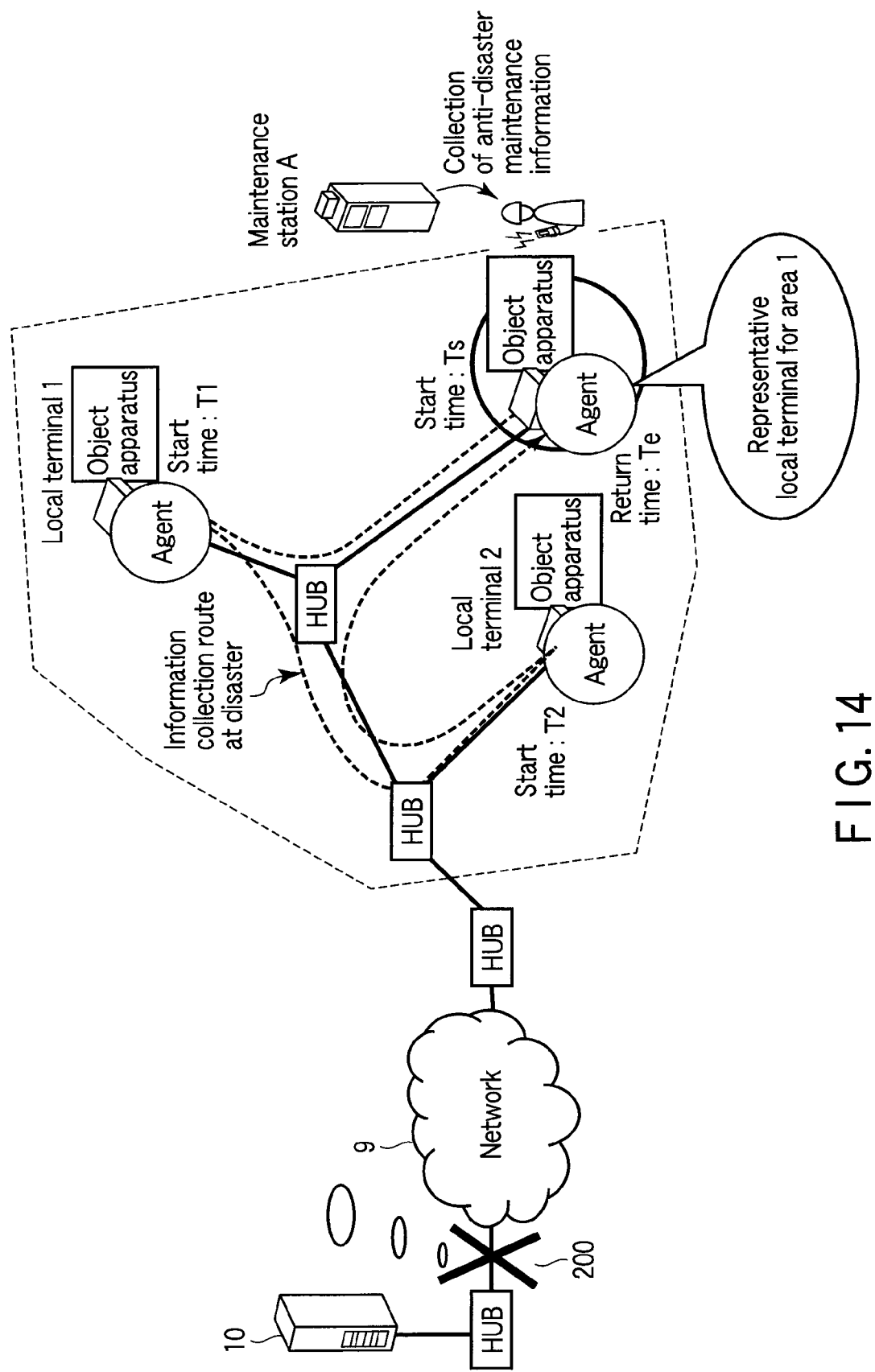
FIG. 14 is a conceptual diagram explaining how the mobile program moves in the second embodiment.

The sequence of collecting anti-disaster maintenance information in the first embodiment will be explained with reference to the flowchart of FIG. 14.

The representative-local-terminal determining unit 17 may determine that the local terminal is not the representative local terminal. Then, the local terminal cannot collect the maintenance information from the representative local terminal if it is not connected to the representative local terminal in the maintenance area. Hence, if the network connecting the local terminal to the representative local terminal is cut, the representative local terminal existing in the next maintenance is used, determining whether the local terminal is connected to the representative local terminal. Next, of the other local terminals connected to the local terminal in question, the one that should be selected first is used as the representative local terminal. As the sequence of these steps is repeated, the cutting of the network can be detected to some extent.

To be more specific, if the local terminal is not the representative one, the representative-local-terminal determining unit 17 provided in the local terminal asks the first representative local terminal to be selected (Step S21). Then, the unit 17 determines whether the first representative local terminal can function as a representative local terminal (Step S22). That is, the representative local terminals are selected one after another in the prescribed order of selecting the representative local terminals, and the maintenance-staff member only needs to walk to the representative local terminal, one after another, in the prescribed order. This helps to reduce the load on the part of the maintenance-staff member.

The representative-local-terminal determining unit 17 may have no responses from the first representative local terminal (that is, NO in Step S22). In this case, the unit 17 determines that the first representative local terminal is not able to function as a representative local terminal, and sets the next representative local terminal as a candidate for the representative local terminal (Step S23). Then, the representative-local-terminal determining unit 17 determines whether the second representative local terminal can function as a representative local terminal (Step S24). If the second representative local terminal can function as such (if YES in Step S24), the unit 17 sets the second representative local terminal as the representative local terminal (Step S25).

If the local terminal is not the representative one (if NO in Step S24), the representative-local-terminal determining unit 17 provided in the local terminal asks the second representative local terminal now set to be selected, if the second representative local terminal can function as a representative local terminal (Step S26). Then, the representative-local-terminal determining unit 17 determines whether the second representative local terminal has made a response to that inquiry (Step S27).

The representative-local-terminal determining unit 17 may have no responses from the second representative local terminal (that is, NO in Step S27). Then, the process returns to Step S23. Thus, the candidates for the representative local terminal will be selected, one after another, as the representative local terminal. On the other hand, if the unit 17 have an response from the second representative local terminal (if YES in Step S27), it determines that the second representative local is able to function as a representative local terminal and sets the second representative local terminal as the representative one (Step S28).

In this case, the anti-disaster maintenance-information transmitting unit 25 transmits the anti-disaster maintenance-information about the local terminal to the representative local terminal in response to the request transmitted from the representative local terminal (Step S31).

In Step S25, the representative-local-terminal determining unit 17 may set the local terminal incorporating it, as the representative local terminal. If this is the case, the anti-disaster maintenance-information requesting unit 20 informs the other local terminals that have made no inquiries that the unit 17 has set the local terminal as the representative local terminal (Step S32). The unit 20 then asks the other local terminals in the same maintenance area to transmit anti-disaster maintenance-information (Step S33).

After asking for the transmission of the anti-disaster maintenance-information, the anti-disaster maintenance-information requesting unit 20 waits for a prescribed time, for responses from the other local terminals (Step S34).

Upon lapse of the prescribed time, the anti-disaster maintenance-information requesting unit 20 determines whether the anti-disaster maintenance information has been collected from all other local terminals (Step S35). If NO in Step S35, the process returns to Step S34. Steps S34 and S35 are repeated three times (e.g., for 30 minutes, 10 minutes each time). Any other local terminal from which the anti-disaster maintenance information has not been collected is considered disconnected from the local terminal now acting as the representative local terminal. When the anti-disaster maintenance information is collected from all other local terminals (if YES in Step S35), the local terminal collecting the information.

Thus, any local terminal used as the representative local terminal can collect the anti-disaster maintenance information from any other local terminal existing in the same maintenance area. Moreover, since the local terminal used as the representative local terminal can detect any local terminal not connected to it, it can collect the information representing line-cut, as anti-disaster maintenance information.

The representative-local-terminal determining unit 17 may have a response from the first representative local terminal (that is, YES in Step S22). If this is the case, the process goes to Step S29. In Step S29, the unit 17 sets the first representative local terminal as a representative local terminal. In response to the request coming from the representative local terminal, the anti-disaster maintenance-information transmitting unit 25 transmits the anti-disaster maintenance-information about the local terminal to the representative local terminal (Step S30).

The process of switching the representative local terminal to another as described above will be explained with reference to FIG. 5.

Assume that, as shown in FIG. 5, the local terminal 1 is the first candidate for the representative local terminal, because it is closer to the maintenance station A than any other local terminal in the maintenance area 1. In this case, any local terminal closer to the maintenance station A than the next one is used as representative local terminal before the next one is used as such. In the maintenance area 1 of FIG. 5, the terminals 1, 2, 3 . . . 9 are used as such, one after another in the order they are mentioned. Not malfunctioning or damaged, the local terminal 1 is the first to be used as the representative local terminal in the normal operation of the system of FIG. 1.

As shown in FIG. 5, a line is cut at position 210 in the maintenance area 1, disconnecting the local terminals 4, 6, 7, 8 and 9 from the local terminal 1 working as the representative local terminal. Therefore, the local terminals 4, 6, 7, 8 and 9 receive no request for the anti-disaster maintenance information from the local terminal 1, i.e., representative local terminal, even after a prescribed time from the start of executing the anti-disaster process program (e.g., time any local terminal needs to make an inquiry to, and receives a response from, the remotest other local terminal in the same area). Hence, the process proceeds to the candidates (except the local terminal 1) for the representative local terminal, one after another.

As pointed out above, any local terminal closer to the maintenance station A than the next one is used as representative local terminal before the next one, and the terminals 1, 2, 3 . . . 9 are therefore used as such, one after another in the order they are mentioned. Hence, in the sub-area 2 defined as the result of line cutting, the local terminal 4 is first used as the representative local terminal. The local terminals 4, 6, 7, 8 and 9, all existing in the sub-area 2, can be used as the representative local terminal, too, because they are disconnected from the local terminal 1 in the sub-area 1.

In the sub-area 1, the local terminal 1 has transmitted a request for the anti-disaster maintenance information to all other local terminals excising in the sub-area 1 and received responses from them. The local terminal 1 can determine that the local terminals 4, 6, 7, 8 and 9, from which it receives no responses, are not connected to it. Also, the local terminal 1 can determine that the local terminals 2 and 5 are connected to it. In the sub-area 2, too, the local terminal 4 works as the representative local terminal, requesting all other local terminals existing in the maintenance area 1 to transmit the anti-disaster maintenance information. If the local terminal 4 receives no responses from the local terminals 1, 2 and 5 and receives responses from the local terminals 6, 7, 8 and 9. The local terminal 4 therefore determines that the local terminals 1, 2 and 5 are not connected to it, and that the local terminals 6, 7, 8 and 9 are connected to it.

Thus, the representative local terminal in each sub-area can determine which local terminals are disconnected from it. In the instance described above, candidates for the representative local terminal exist in either sub-area. Nonetheless, even if no candidates exist in either sub-area, each local terminal may ask all other local terminals if any line has been cut. As a result, any local terminal may be found to have data about the "distances between the maintenance station and all local terminals in the sub-area. In this case, the next representative local terminal can be automatically determined from this data. For example, a logical rule based on the distances between the maintenance station and all local terminals may be applied, utilizing the local terminal at a shorter distance from the maintenance station than any other local terminal in the maintenance area, as the representative local terminal.

If the area is relatively small, for example, only one floor of a building, the network communication utilizing power-supplying lines can be used to acquire line-cut data. The line-cut data can be acquired, because the current no longer flows once the power-supplying lines have been.

In the system according to this embodiment, when the network is cut, the anti-disaster maintenance information can be efficiently collected from the remote local terminals. More precisely, the local area in which an object apparatus is installed is divided into a plurality of maintenance areas. In each maintenance area, a plurality of local terminal are arranged, and the data communication between the local terminals is utilized to collect anti-disaster maintenance information at one of the terminals, which is used as the representative local terminal. The maintenance information can therefore be acquired efficiently at the event of a disaster. The local area may be divided into maintenance areas of the same size. Alternatively, the local area may be divided so that the local terminal used as the representative local terminal may be located closed to a maintenance station than any other local terminal arranged in the same maintenance area. This helps to reduce the load on the part of the maintenance-staff member who needs to walk to the representative local terminal.

Further, the data about the active fault is taken into consideration to determine how the local area should be divided into maintenance areas and which local terminal in each maintenance area should be used as the representative local terminal. Thus, line-cut is least likely to takes place in each maintenance area and the representative local terminal is least likely to be damaged when an earthquake comes. Further, inquiries are made as to whether any local terminal in each maintenance area is operating well (not malfunctioning or disconnected from the network) before transmitting the anti-disaster maintenance information to and from the local terminal. Hence, even the data about line-cut, if any, can be collected at the representative local terminal.

Furthermore, the information can be collected and processed at high efficiency because the portable instruction-transmitting terminal the maintenance-staff member is holding can receive the information, as electronic data, from the any local terminal. Particularly, if the local terminals can perform radio communication with one another, the maintenance-staff member can collect the information even if he or she is unable to approach the local terminal at the time of a disaster. Note that the representative local terminal had better be selected before the transmission of the information. The representative local terminal may indeed be automatically selected, but it must be retrieved by the maintenance-staff member.

Second Embodiment

Figure 7:
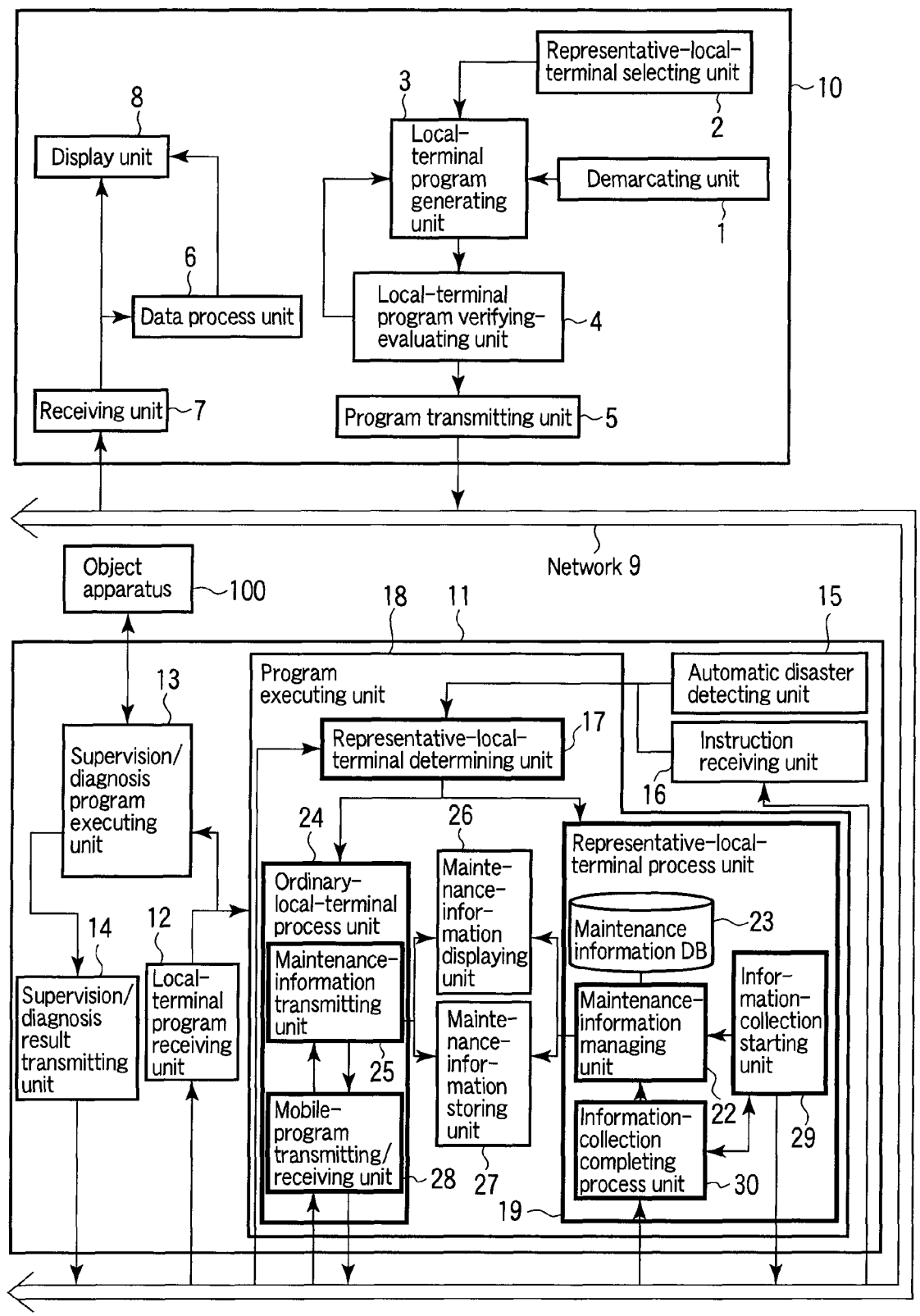
FIG. 7 is a block diagram showing the configuration of a system according to a second embodiment of the present invention.
Figure 8:
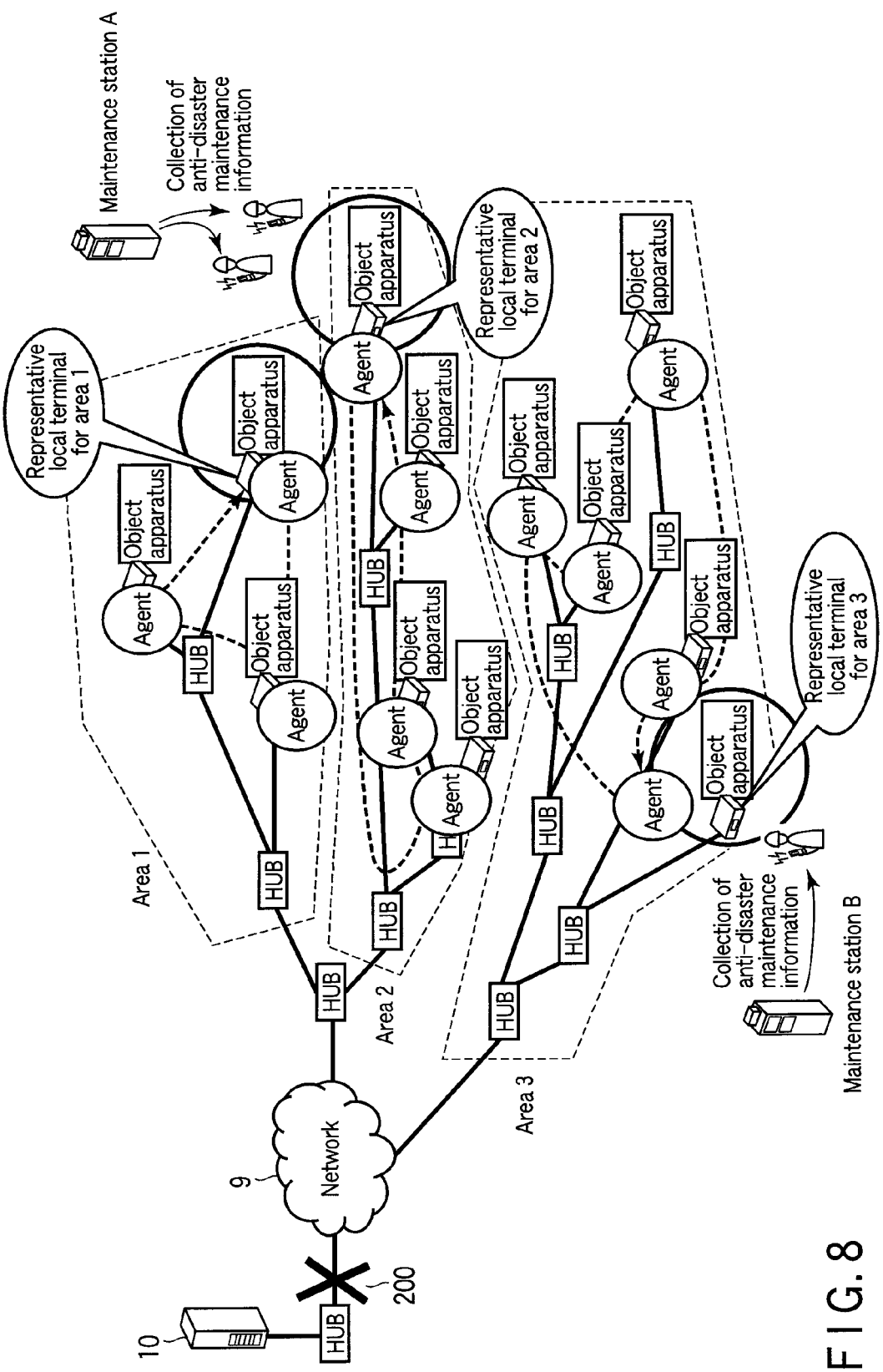
FIG. 8 is a diagram representing the concept of operation of the system according to the second embodiment.

FIG. 7 is a block diagram showing the configuration of a system according to a second embodiment of the present invention. The components similar to those of the first embodiment shown in FIG. 1 are designated by the same reference numbers and will not be described in detail.

In the system according to this embodiment, each local terminal 11 has an anti-disaster representative-local-terminal process unit 19 and an anti-disaster ordinary-local-terminal process unit 24. The anti-disaster ordinary-local-terminal process unit 24 includes a mobile-program transmitting/receiving unit 28 configured to transmit an information collection mobile program. The anti-disaster representative-local-terminal process unit 19 includes a program-information-collection starting unit (hereinafter called "information-collection starting unit") 29. The anti-disaster representative-local-terminal process unit 19 further includes a process unit 30 for completing the collection of the mobile program (hereinafter called "information-collection completing process unit").

(Operation of the System)

As in the first embodiment, the anti-disaster-process program executing unit 18 remains to operate until a disaster occurs. When the automatic disaster detecting unit 15 detects the disaster or when the anti-disaster-process-start instruction receiving unit 16 issues an anti-disaster start instruction, the anti-disaster-process program executing unit 18 determines that a disaster has come and therefore starts executing the anti-disaster process program. Then, the representative-local-terminal determining unit 17 determines whether the local terminal is the representative local terminal or an ordinary local terminal.

Figure 9:
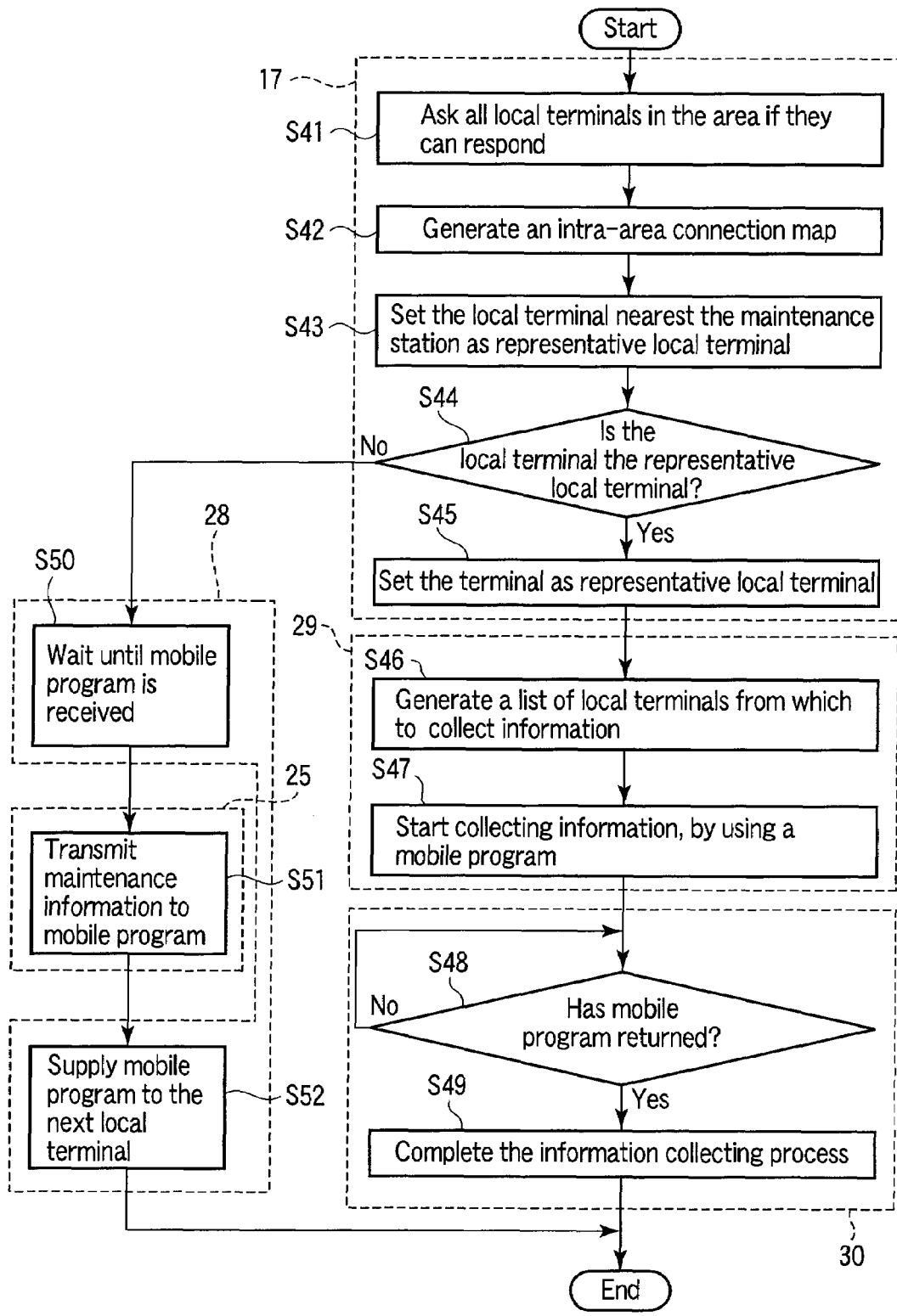
FIG. 9 is a flowchart explaining the process sequence described in a mobile program used in the second embodiment.

The present embodiment is so configured that the information-collecting mobile program moves from a local terminal to another, thereby to collect information from each local terminal. How the information is so collected will be explained with reference to the flowchart of FIG. 9.

First, the representative-local-terminal determining unit 17 asks all other local terminals existing in the area, if they are able to respond (Step S41). Based on the responses from the other local terminals, the unit 17 generates a map (intra-area connection map) that shows how the local terminals are connected in the area (Step S42). The map is, for example, a table that shows how each local terminal is connected to all other local terminal in the same area. All other local terminals existing in the area perform such a process. As a result, all local terminals have an intra-area connection map each.

Next, the representative-local-terminal determining unit 17 determines from the intra-area connection map that the local terminal closest to the maintenance station is the representative local terminal (Step S43). If there is no network line-cut in the area, the local terminal having the highest priority as a candidate for the representative local terminal is set as the representative local terminal.

If there is network line-cut in the area, the area is divided into sub-areas. Therefore, any one of the local terminals existing in the same sub-area must be set as the representative local terminal. One of the local terminals existing in the same sub-area, including the local terminal in question, is selected as the representative local terminal, by using the intra-area connection map. Of all local terminals existing in the same sub-area, the local terminal nearest the maintenance station may be selected as the representative local terminal. Instead, the local terminal having the highest priority as a candidate for the representative local terminal may be selected as the representative local terminal.

Then, the representative-local-terminal determining unit 17 determines whether the representative local terminal thus set is the local terminal in question (Step S44). If the representative local terminal is the local terminal in question (if YES in Step S44), the local terminal in question is set as the representative local terminal (Step S45).

If the representative local terminal is any local terminal other than the local terminal in question (if NO in Step S44), the local terminal in question will operate as an ordinary local terminal. That is, the anti-disaster ordinary-local-terminal process unit 24 remains to operate until the mobile-program transmitting/receiving unit 28 receives the information-collecting mobile program comes from the representative local terminal (Step S50). Eventually, the information-collecting mobile program arrives at the anti-disaster maintenance-information transmitting unit 25. At this point, the anti-disaster maintenance-information transmitting unit 25 transfers the anti-disaster maintenance information about the local terminal to the information-collecting mobile program (Step S51).

Before transporting the anti-disaster maintenance information, the anti-disaster maintenance-information transmitting unit 25 adds one unit of program code to the information-collecting mobile program. The unit 25 may use a port to transfer the information-collecting mobile program. The information-collecting mobile program may be provided as an agent. The mobile program is, for example, a Bee-agent (registered trademark). Then, the agent can hold data by using, for example, a baggage command. Information can therefore be collected, utilizing the baggage command.

After the anti-disaster maintenance information about the local terminal in question has been collected, the mobile-program transmitting/receiving unit 28 supplies the information-collecting mobile program to the next local terminal (Step S52). In this case, the anti-disaster maintenance-information transmitting unit 25 outputs a trigger to the mobile-program transmitting/receiving unit 28 in order to terminate the transmission of the anti-disaster maintenance information. In response to the trigger, the mobile-program transmitting/receiving unit 28 moves the information-collecting mobile program to the next local terminal.

The information-collecting mobile program may be moved in various methods. One method is to move the mobile program at the very time described in the mobile program per se. Another method is to set in each local terminal the data representing candidate destinations to which the mobile program may be moved. In the latter method, a plurality of such candidate destinations must be set in each local terminal. To move the mobile program, the mobile-program transmitting/receiving unit 28 may not only merely transmit the program to the next local terminal. But also the unit 28 may transmit the mobile program by performing the program-moving process described in the mobile program per se, if the mobile program is an agent that can move by itself.

The local terminal in question may be found to the representative local terminal (YES in Step S44). Then, the local terminal performs the process any representative local terminal should perform (Step S45). That is, the information-collection starting unit 29 provided in the anti-disaster representative-local-terminal process unit 19 generates a list of the local terminals that receive the information-collecting mobile program and should therefore collect information, in accordance with the above-mentioned intra-area connection map (Step S46). In Step S46, the local-terminal entries may be arranged in the order of representative-terminal candidate priority. If the local-terminal candidate priority is the descending order of distance from the maintenance station, the local terminal nearest the maintenance station first collects information, the local terminal second nearest then collects information, and so forth.

The information-collection starting unit 29 starts executing the information-collecting mobile, collecting the anti-disaster maintenance information from the local terminals described in the list generated (Step S47). More precisely, the information-collecting mobile program moves from one local terminal to another, whereby each local terminal collects the anti-disaster maintenance information. When the anti-disaster maintenance information are collected from all local terminals, the information-collecting mobile program no longer exists in the local terminal in question, i.e., representative local terminal.

The information-collection starting unit 29 then informs the information-collection completing process unit 30 of the completion of the information collecting process. The information-collecting mobile program moves to all other local terminals existing in the same area (or sub-area) where the local terminal in question, i.e., representative local terminal exists. Hence, all other local terminals collect the anti-disaster maintenance information.

In the representative local terminal, the information-collection completing process unit 30 waits for the information-collecting mobile program that may come again, after informed by the information-collection starting unit 29 that the completion of the information-collection starting process has been completed. Whether the information-collecting mobile program has come again is determined (Step S48). If the information-collecting mobile program has come again (if YES in Step S48), the information-collection completing process unit 30 performs an information-collection completing process (Step S49). In the information-collection completing process, the anti-disaster maintenance information about the local terminal in question is collected as the last anti-disaster maintenance information.

Before moving to the next local terminal, the information-collecting mobile program determines whether the next local terminal is prepared to receive it. If the response from the next local terminal is affirmative, the program moves to the next local terminal. If the response from the next local terminal is negative because any unit is damaged in the next local terminal, or if no response come within a preset time (e.g., sum of a normal communications time defined by a PING command and a specific tolerance time), the next local terminal is considered disconnected (or unable to receive the information-collecting mobile program). In this case, the information-collecting mobile program moves to a farther local terminal.

Figure 12:
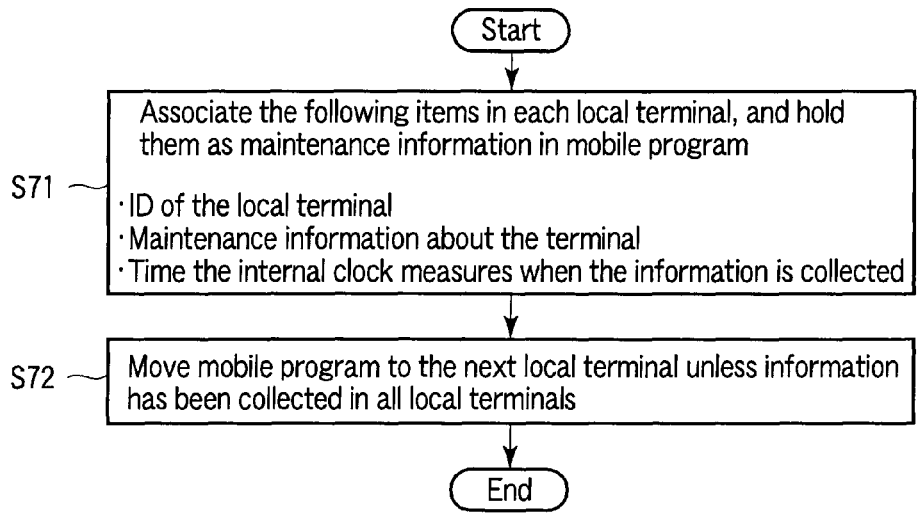
FIG. 12 is another flowchart explaining the process sequence described in a mobile program used in the second embodiment.

The information-collecting mobile program may be a self-moving agent. If this is the case, when the information-collecting program fails to move or moves but taking a time longer than the present time, the program determines that the next local terminal has been disconnected and then collects the latest line-cut information. Further, the information-collecting mobile program infers the abnormality of time data at any local terminal, from the time of starting the information collection, the time of completing the information collection, and the time of collecting the anti-disaster maintenance information at each local terminal. (See FIG. 12 and FIG. 13.)

Figure 13:
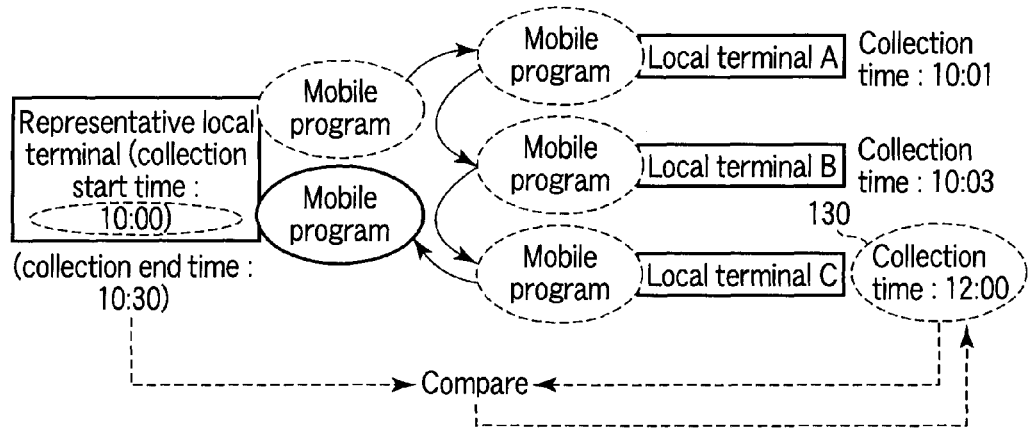
FIG. 13 is a diagram representing the concept of operation of the representative local terminal used in the second embodiment.

As FIG. 13 shows, the time the local terminal C collects information is long after the time the information-collecting mobile program returns to the representative local terminal after it has worked to collect information. (In other words, the local terminal C collects information upon lapse of a tolerance period.) The time the local terminal C collects information is obviously extraordinary (see item 130 shown in FIG. 13).

The information collected by using the information-collecting mobile program is transferred to the anti-disaster maintenance-information managing unit 22. As in the first embodiment, the unit 22 stores the information into the anti-disaster maintenance information DB 23 and supplies the same to the anti-disaster maintenance-information displaying unit 26. The unit 26 displays the information. The anti-disaster maintenance-information storing unit 27 holds one or all units of the information collected and transferred from the anti-disaster maintenance-information managing unit 22.

In the system according to this embodiment, the information-collecting mobile program supplied from the representative local terminal moves from one local terminal to another, through the network 9. While moving so, the information-collecting mobile program collects anti-disaster maintenance-information at each local terminal. The representative local terminal accumulates the information collected at the local terminals, thus acquiring the anti-disaster maintenance-information at high efficiency.

Further, any disaster is detected in the system, and the information-collecting mobile program automatically starts collecting information when the system detects a disaster. Before moving to a local terminal, the information-collecting mobile program asks the local terminal if it can move to the local terminal. This enables the system to acquire the latest line-cut information about the network.

Moreover, the information-collecting mobile program performs the process 150 shown in FIG. 15, detecting a trouble in the internal clock provided in each local terminal, from time Ts when the program started moving, time Te when the program returned to the representative local terminal, time T1 when the program passed local terminal T1, and time T2 when the program passed local terminal T2. That is, time Ts is compared with time Te, time T2 and time T2. Hence, if the difference time Ts and time T1 is obviously strange, the local terminal T1 is considered to have a trouble, and if the difference time Ts and time T2 is obviously strange, the local terminal T2 is considered to have a trouble (see FIG. 14). In FIG. 14, the broken-line curves indicate the routes along which the information-collecting mobile program moves.

Third Embodiment

Figure 16:
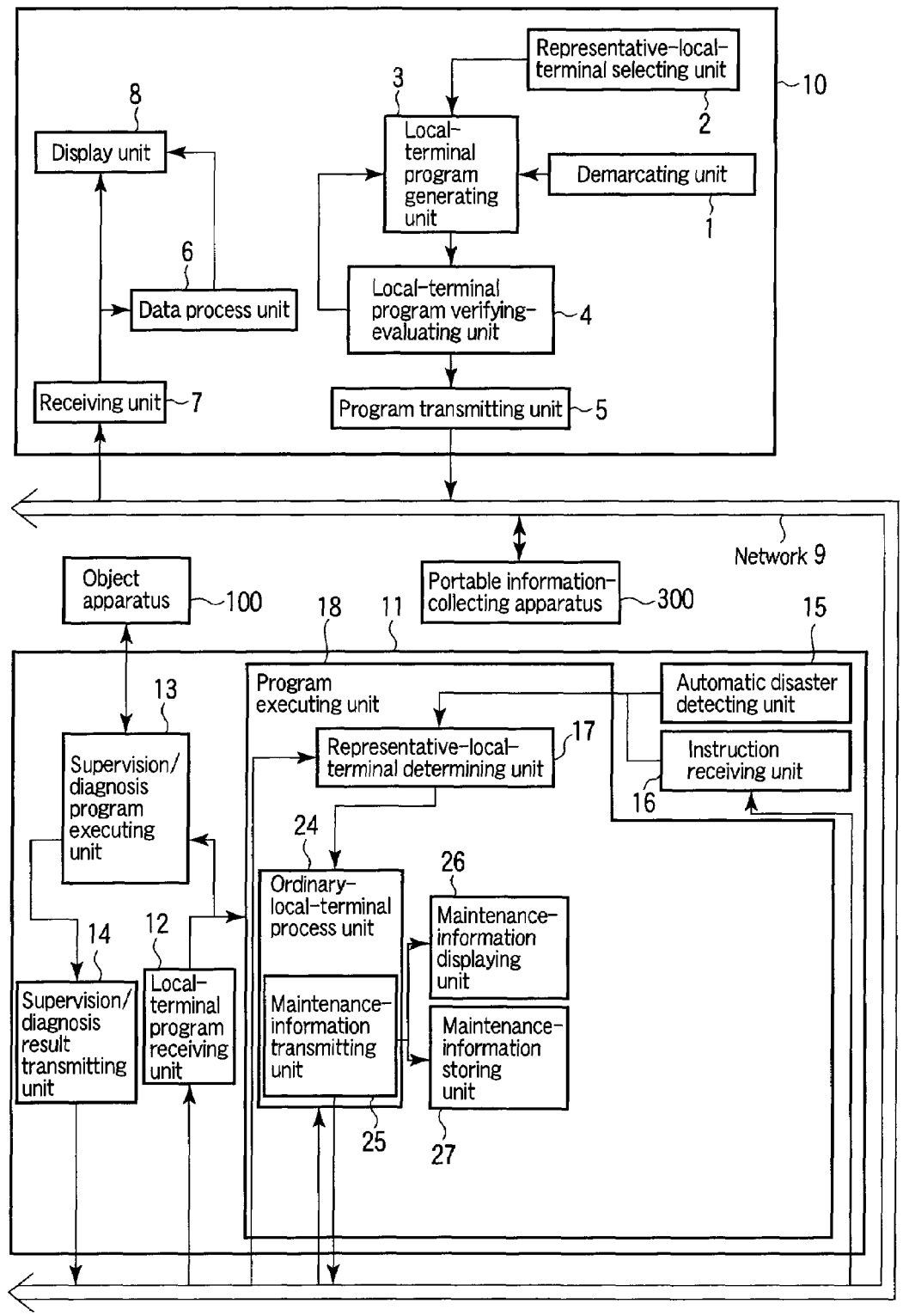
FIG. 16 is a block diagram showing the configuration of a system according to a third embodiment of the present invention.

FIG. 16 is a block diagram showing the configuration of a system for remote supervision and diagnosis, according to a third embodiment of the present invention. The components similar to those of the first embodiment shown in FIG. 1 are designated by the same reference numbers and will not be described in detail.

The system according to this embodiment has a portable information-collecting apparatus 300 that is connected to the network 9. Each local terminal 11 includes an anti-disaster ordinary-local-terminal process unit 24, but not an anti-disaster representative-local-terminal process unit 19.

(Operation of the System)

The portable information-collecting apparatus 300 can be held and carried by the maintenance-staff member. The maintenance-staff member may connect the apparatus 300 to the network 9 and may then use the apparatus 300. More precisely, the portable information-collecting apparatus 300 can be LAN-connected to any hub to which the local terminal 11 is connected.

The portable information-collecting apparatus 300 includes the same function components as the anti-disaster representative-local-terminal process unit 19 (FIG. 1) does. That is, the apparatus 300 has an anti-disaster maintenance-information requesting unit 20, an anti-disaster maintenance-information receiving unit 21, an anti-disaster maintenance-information managing unit 22, and an anti-disaster maintenance information database (DB) 23.

Figure 17:
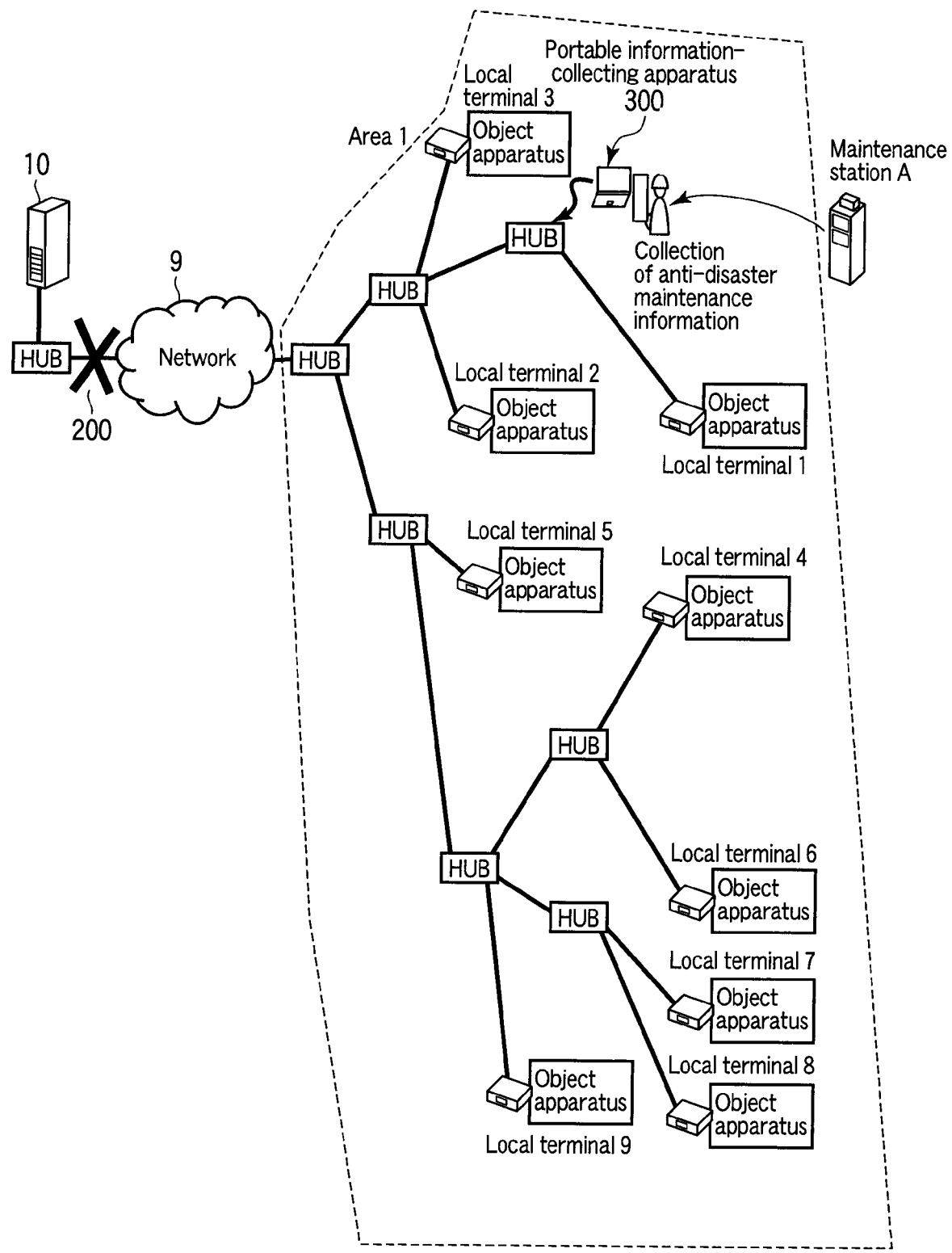
FIG. 17 is a conceptual diagram explaining the operation of the system according to the third embodiment.

As shown in FIG. 17, the portable information-collecting apparatus 300 may be connected to local terminals 1 to 9 via the network 9. The anti-disaster maintenance information can thereby down-loaded from the local terminals 1 to 9 into the portable information-collecting apparatus 300. Thus, the apparatus 300 can collect the anti-disaster maintenance information about the area in which the local terminals 1 to 9 are arranged. Since the apparatus 300 can be connected to any part of the network 9, the local terminals 1 to 9 need not have a data-transmitting function. In other words, the apparatus 300 collects information from any local terminal through the network 9.

Fourth Embodiment

FIG. 18 is a block diagram showing the configuration of a system for remote supervision and diagnosis, according to the fourth embodiment of this invention. The components similar to those of the first embodiment shown in FIG. 1 are designated by the same reference numbers and will not be described in detail.

The system according to this embodiment has a mini-server 400 that can be connected to the network 9. The mini-server 400 performs the same function as the representative local terminal does in the first embodiment. Each local terminal 11 includes an anti-disaster ordinary-local-terminal process unit 24, but not an anti-disaster representative-local-terminal process unit 19.

(Operation of the System)

The mini-server 400 is connected to the network 9 and then used. The mini-server 400 includes the same function components as the anti-disaster representative-local-terminal process unit 19 (FIG. 1) does. That is, the mini-server 400 has an anti-disaster maintenance-information requesting unit 20, an anti-disaster maintenance-information receiving unit 21, an anti-disaster maintenance-information managing unit 22, and an anti-disaster maintenance information database (DB) 23.

Figure 19:
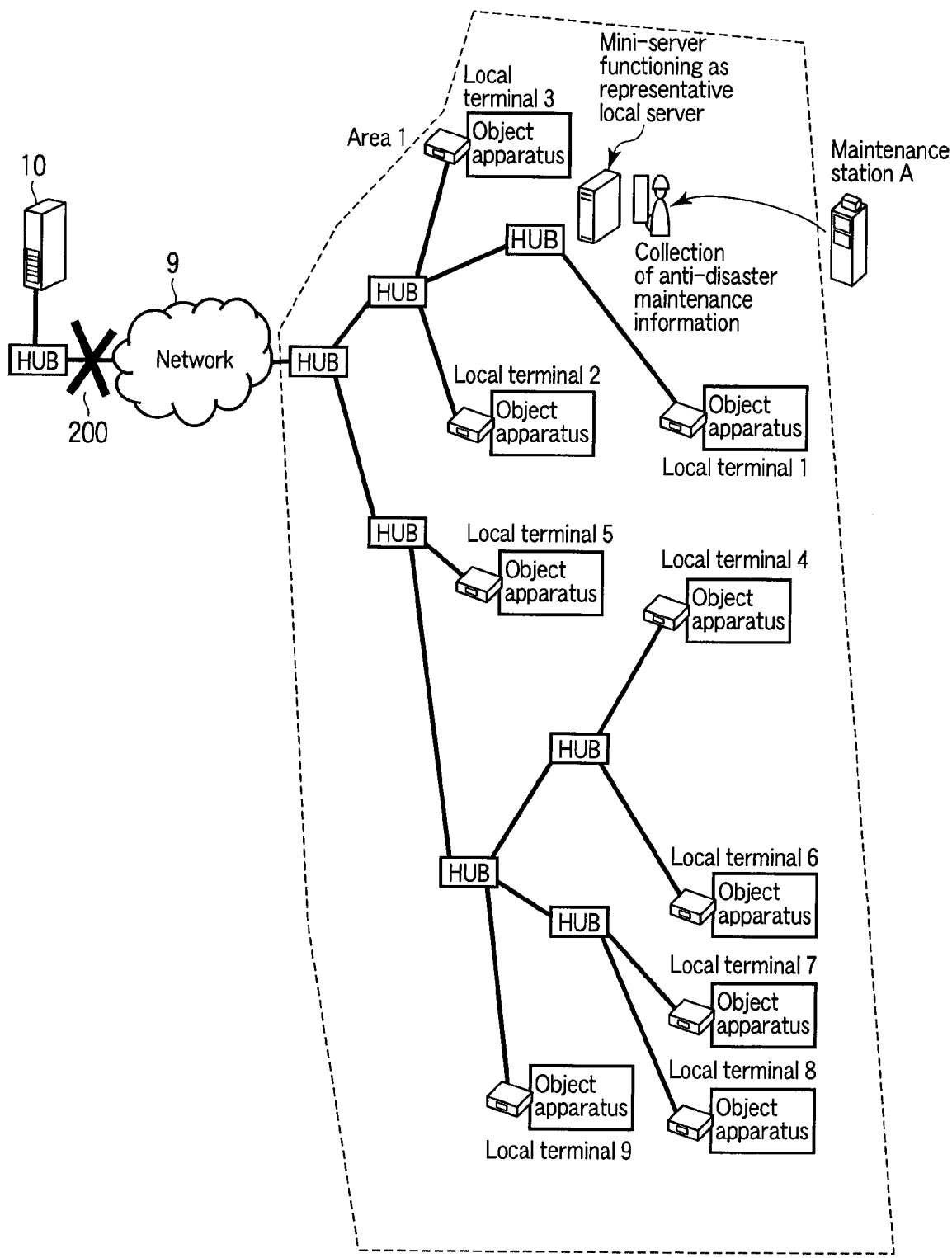
FIG. 19 is a conceptual diagram explaining the operation of the system according to the fourth embodiment.

As shown in FIG. 19, the mini-server 400 may be connected to local terminals 1 to 9 via the network 9. The anti-disaster maintenance information can thereby down-loaded from the local terminals 1 to 9 into the mini-server 400. Thus, the apparatus 300 can collect the anti-disaster maintenance information about the area in which the local terminals 1 to 9 are arranged. The mini-sever 400 incorporates a storage device than can store more data than the portable information-collecting apparatus 300. The mini-server 400 can therefore collect and accumulate the anti-disaster maintenance information in large quantities.

Thus, the mini-server 400, if incorporated in the system despite the high cost, can collect and accumulate a large amount of anti-disaster maintenance information and can yet function as a representative local terminal at the event of a disaster. Hence, the mini-server 400 can collect the anti-disaster maintenance information at high efficiency.

In the embodiments described above, each of the local terminals arranged in the same area automatically determines the representative local terminal. Instead, the representative local terminal may be designated when the local terminals are installed in the area. Further, only one local terminal may be installed in a maintenance area in the system according to any embodiment described above.

Any embodiment described above can provide a system for performing remote supervision and diagnosis, which can efficiently collect maintenance information required for supervising and diagnosing an object when a disaster comes, so that effective measures may be taken against the disaster.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A system comprising:
    a plurality of local terminals connected to a central system by a network and configured to perform supervision and diagnosis on an object apparatus existing in a specific area;
    a program-moving module configured to move a supervision/diagnosis program or an anti-disaster process program from the central system to any one of the local terminals;
    a setting module configured to set one of the local terminals arranged in the specific area as a representative local terminal when the local terminals are disconnected from the central system in spite of the network, the setting module setting ones of the local terminals which are operable each as the representative local terminal in a prescribed order; and
    an information-collecting module configured to collect anti-disaster maintenance information via the representative local terminal from any other local terminal arranged in the area by moving an anti-disaster information-collecting mobile program from the representative local terminal to any other local terminal arranged in the area, the representative local terminal collecting the anti-disaster maintenance information from all local terminals arranged in the area, by utilizing the anti-disaster process program.

2. The system according to claim 1, wherein the information-collecting module collects the anti-disaster maintenance information via the representative local terminal from any other local terminal arranged in the area, by utilizing data communication between the local terminals.

3. The system according to claim 2, wherein the information-collecting module starts collecting the anti-disaster maintenance information in response to a signal indicating occurrence of a disaster or to a request coming from an external unit system, and collects the anti-disaster maintenance information from the other local terminals by requesting the other local terminals to transmit the anti-disaster maintenance information.

4. The system according to claim 3, further comprising a module configured to determine that the network has been cut in the area when no responses come from the representative local terminal within a prescribed time, and to generate data showing that the network has been cut in the area.

5. The system according to claim 2, wherein in the information-collecting module, the representative local terminal starts collecting the anti-disaster maintenance information in response to automatic detection of a disaster or to a request for starting anti-disaster process, coming from an external unit system, and collects the anti-disaster maintenance information from the other local terminals by moving an anti-disaster information-collecting mobile program.

6. The system according to claim 1, wherein the information-collecting module starts collecting the anti-disaster maintenance information in response to a signal indicating occurrence of a disaster or to a request coming from an external unit system, and collects the anti-disaster maintenance information from the other local terminals by requesting the other local terminals to transmit the anti-disaster maintenance information.

7. The system according to claim 6, further comprising a module configured to determine that the network has been cut in the area when no responses come from the representative local terminal within a prescribed time, and to generate data showing that the network has been cut in the area.

8. The system according to claim 1, wherein in the information-collecting module, the representative local terminal starts collecting the anti-disaster maintenance information in response to automatic detection of a disaster or to a request for starting anti-disaster process, coming from an external unit system, and collects the anti-disaster maintenance information from the other local terminals by moving an anti-disaster information-collecting mobile program.

9. The system according to claim 1, wherein in the information-collecting module, the representative local terminal starts collecting the anti-disaster maintenance information in response to automatic detection of a disaster or to a request for starting anti-disaster process, coming from an external unit system, and collects the anti-disaster maintenance information from the other local terminals by moving the anti-disaster information-collecting mobile program.

10. The system according to claim 1, further comprising a module configured to determine that the network has been cut in the area when the anti-disaster information-collecting mobile program is unable to move from the representative local terminal to any other local terminal arranged in the same area.

* * * * *